(12) United States Patent
Nobayashi

(10) Patent No.: US 10,659,744 B2
(45) Date of Patent: May 19, 2020

(54) DISTANCE INFORMATION GENERATING APPARATUS, IMAGING APPARATUS, AND DISTANCE INFORMATION GENERATING METHOD

(71) Applicant: CANON KABUSHIKI KAISHA, Tokyo (JP)

(72) Inventor: Kazuya Nobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/009,317

(22) Filed: Jun. 15, 2018

(65) Prior Publication Data

US 2018/0367772 A1 Dec. 20, 2018

(30) Foreign Application Priority Data

Jun. 20, 2017 (JP) .................................. 2017-120848

(51) Int. Cl.
| H04N 9/64 | (2006.01) |
| H04N 13/204 | (2018.01) |
| G02B 7/34 | (2006.01) |
| H04N 13/257 | (2018.01) |
| H04N 9/04 | (2006.01) |

(Continued)

(52) U.S. Cl.
CPC ............... *H04N 9/646* (2013.01); *G02B 7/34* (2013.01); *G06T 7/55* (2017.01); *H04N 9/045* (2013.01); *H04N 13/204* (2018.05); *H04N 13/257* (2018.05); *G06T 2207/10024* (2013.01); *G06T 2207/20192* (2013.01); *H04N 2013/0081* (2013.01)

(58) Field of Classification Search
CPC .... H04N 9/646; H04N 13/204; H04N 13/257; G02B 7/34; G06T 5/006
See application file for complete search history.

(56) References Cited

U.S. PATENT DOCUMENTS

| 4,696,558 A | 9/1987 | Karasaki et al. |
| 2014/0176780 A1 | 6/2014 | Koshiba |
| 2014/0267622 A1* | 9/2014 | Kasahara ............. G01B 11/026 348/46 |

FOREIGN PATENT DOCUMENTS

| JP | 2003-269917 A | 9/2003 |
| JP | 2011-007882 A | 1/2011 |

OTHER PUBLICATIONS

The above patent documents were cited in a European Search Report issued on Oct. 30, 2018, which is inclosed, that issued in the corresponding European Patent Application No. 18178239.2.

* cited by examiner

*Primary Examiner* — Ahmed A Berhan
(74) *Attorney, Agent, or Firm* — Cowan, Liebowitz & Latman, P.C.

(57) ABSTRACT

The distance information generating apparatus includes a generating unit configured to generate the distance information, based on the parallax between the first image signal and the second image signal; an acquiring unit configured to acquire chromatic aberration information indicative of chromatic aberration of an image-forming optical system used in photographing of the first image signal and the second image signal; and a correction unit configured to correct the distance information generated in the generating unit, based on a contrast evaluation value generated for each of the plurality of pieces of color information from the third image signal, and the chromatic aberration information.

15 Claims, 15 Drawing Sheets

(51) Int. Cl.
*G06T 7/55* (2017.01)
*H04N 13/00* (2018.01)

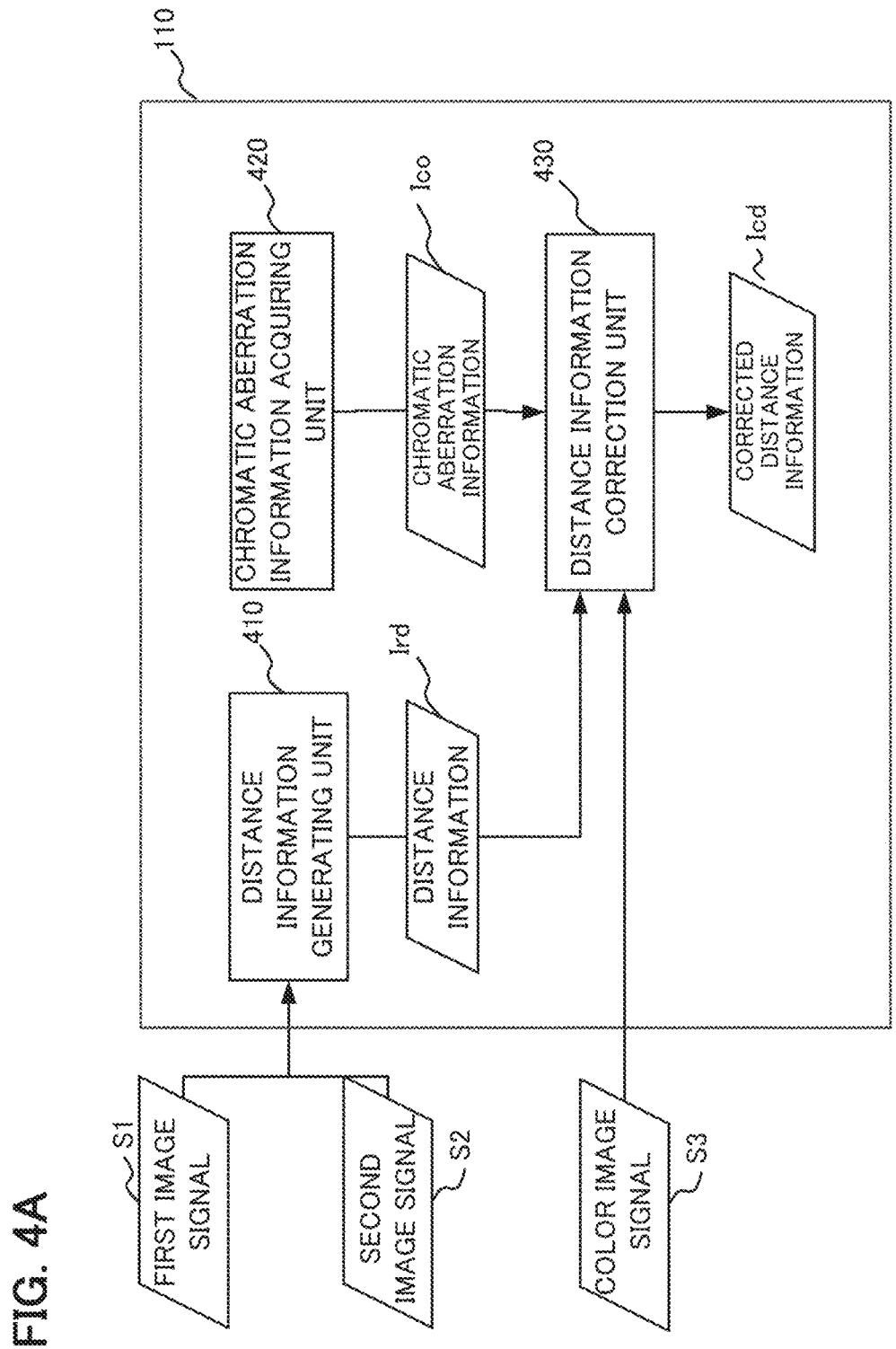

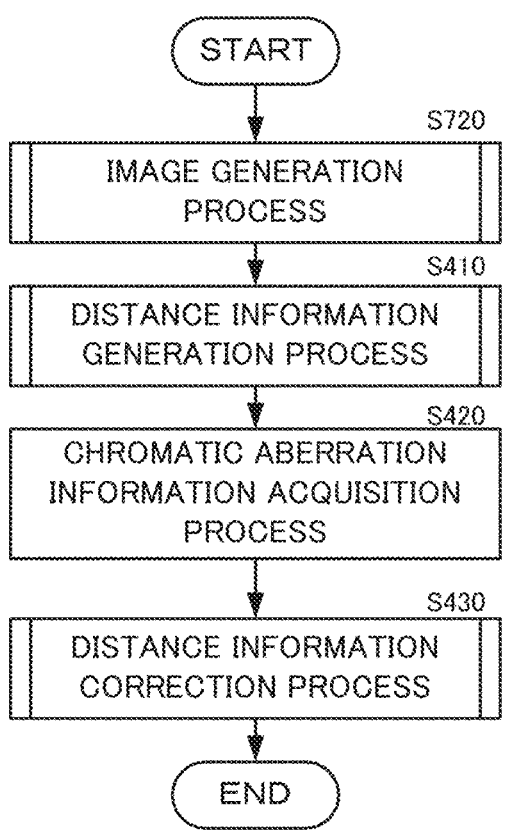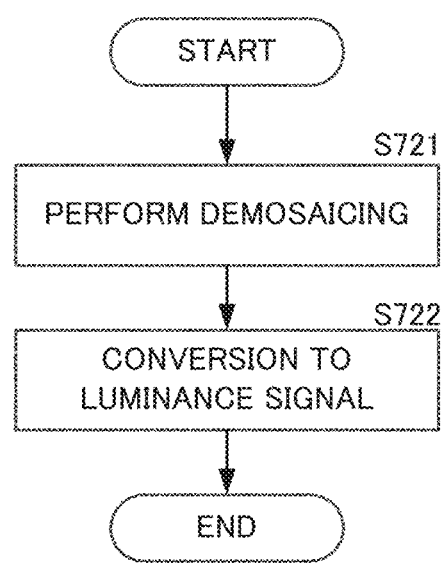

DISTANCE INFORMATION GENERATING APPARATUS, IMAGING APPARATUS, AND DISTANCE INFORMATION GENERATING METHOD

BACKGROUND OF THE INVENTION

Field of the Invention

The present invention relates to a distance information generating apparatus, and particularly relates to a distance information generating apparatus used in an imaging apparatus such as a digital camera or a digital video camera.

Description of the Related Art

In an imaging apparatus such as a digital still camera or a digital video camera, there is proposed an imaging apparatus having a ranging function enabling the acquisition of a viewing image signal and, at the same time, a distance from the imaging apparatus to an object (hereinafter referred to as an object distance) at each of a plurality of pixel positions.

For example, Japanese Patent Application Publication No. 2003-269917 proposes a stereo imaging apparatus in which two imaging apparatuses are disposed in parallel and a distance to an object is detected by a phase difference method. In the stereo imaging apparatus described in Japanese Patent Application Publication No. 2003-269917, a relative positional shift amount (i.e., a parallax amount) between image signals output from the two imaging apparatuses is detected by using a cross-correlation operation, and is converted into the object distance via a predetermined conversion coefficient. In addition, Japanese Patent Application Publication No. 2011-7882 proposes a solid-state image sensor in which pixels each having the ranging function are disposed as part or all of pixels of the image sensor, and the object distance is detected by the phase difference method. In a ranging method described in Japanese Patent Application Publication No. 2011-7882, ranging by the phase difference method is performed on an imaging plane, and hence the ranging method is referred to as an imaging plane phase difference ranging method. In the imaging plane phase difference ranging method, it is possible to acquire two image signals based on images generated by light fluxes having passed through different pupil areas of an image-forming optical system of the imaging apparatus. It is possible to acquire the object distance by detecting the parallax amount between the two image signals by a method similar to the parallax amount detection method of the stereo imaging apparatus and converting the parallax amount into a defocus amount via a predetermined conversion coefficient. Further, in the imaging plane phase difference ranging method, it is possible to generate the viewing image signal by combining the two image signals.

In each of the methods, the parallax amount is converted into the object distance by using an optical coefficient such as the focal length of the image-forming optical system of the imaging apparatus.

Such an imaging apparatus forms an image of an object on the image sensor by using the image-forming optical system. Consequently, depending on the color of the object, there are cases where an error caused by chromatic aberration (axial chromatic aberration, chromatic aberration of magnification) of the image-forming optical system occurs in the detected object distance. For example, in the case where the object is blue, the image of the object is formed at a position corresponding to a blue wavelength, and hence it is necessary to convert the parallax amount into the object distance by using the conversion coefficient corresponding to the blue wavelength. When a wrong conversion coefficient is used at this point, a wrong object distance is detected.

In Japanese Patent Application Publication No. 2011-7882, in an image signal output from imaging pixels having mutually different spectral sensitivity characteristics (e.g., a blue pixel, a green pixel, and a red pixel), the chromatic aberration of the image-forming optical system is corrected by using a ratio of signal values output from the imaging pixels having different spectral sensitivity characteristics. However, the result of the cross-correlation operation for acquiring the parallax amount does not necessarily coincide with the ratio of the signal values, and hence there is a possibility that the correction of the chromatic aberration is inadequate.

SUMMARY OF THE INVENTION

The present invention has been made in view of such a problem, and an object thereof is to provide a technique capable of correcting chromatic aberration of an image-forming optical system with a simple process to detect an object distance with high accuracy.

One aspect of the present invention is a distance information generating apparatus for generating distance information corresponding to a distance to an object, based on a first image signal and a second image signal, which have a parallax corresponding to the distance to the object, and a third image signal which includes a plurality of pieces of color information. The distance information generating apparatus includes a generating unit configured to generate the distance information, based on the parallax between the first image signal and the second image signal; an acquiring unit configured to acquire chromatic aberration information indicative of chromatic aberration of an image-forming optical system used in photographing of the first image signal and the second image signal; and a correction unit configured to correct the distance information generated in the generating unit, based on a contrast evaluation value generated for each of the plurality of pieces of color information from the third image signal, and the chromatic aberration information.

Another aspect of the present invention is a distance information generating method for generating distance information corresponding to a distance to an object, based on a first image signal and a second image signal, which have a parallax corresponding to the distance to the object, and a third image signal which includes a plurality of pieces of color information. The distance information generating method includes: a generation step of generating the distance information, based on the parallax between the first image signal and the second image signal; an acquisition step of acquiring chromatic aberration information indicative of chromatic aberration of an image-forming optical system used in photographing of the first image signal and the second image signal; and a correction step of correcting the distance information generated in the generation step, based on a contrast evaluation value generated for each of the plurality of pieces of color information from the third image signal, and the chromatic aberration information.

According to the present invention, it is possible to correct the chromatic aberration of the image-forming optical system with the simple process to detect the object distance with high accuracy.

Further features of the present invention will become apparent from the following description of exemplary embodiments with reference to the attached drawings.

BRIEF DESCRIPTION OF THE DRAWINGS

FIGS. 4A to 4D are views for explaining a distance information generating (correcting) method in the first embodiment;

FIGS. 8A to 8C are views for explaining a distance information generating (correcting) method in the second embodiment;

DESCRIPTION OF THE EMBODIMENTS

First Embodiment

Figure 1A:
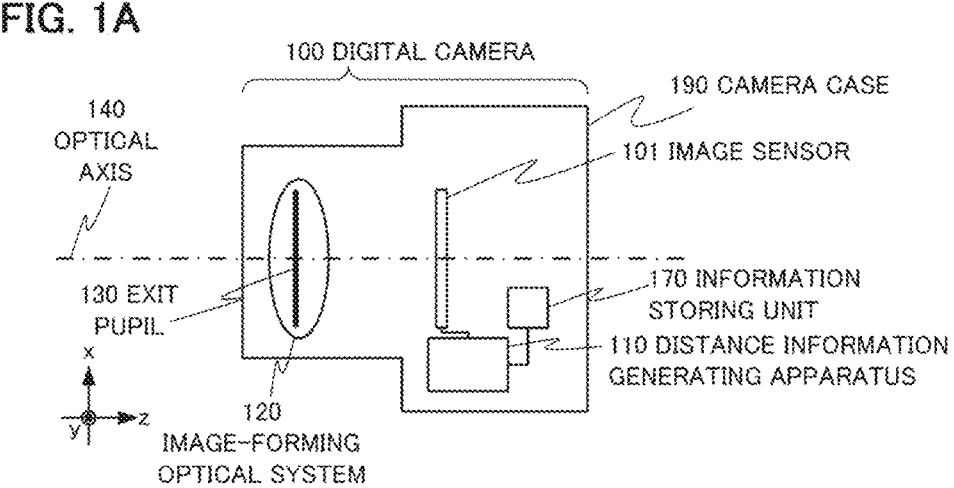
FIGS. 1A and 1B are views showing the configuration of an imaging apparatus that includes a distance information generating apparatus according to a first embodiment.

Hereinbelow, a first embodiment of the present invention will be described in detail with reference to the drawings. In the following description, a digital camera will be used as an example of an imaging apparatus that includes a distance information generating apparatus of the present embodiment, but the application of the present invention is not limited thereto. Note that, in the description based on the reference to the drawings, the same parts are designated by the same reference numerals in principle even when they are shown in different drawings in order to avoid the repetitive description as much as possible.

Configuration of Digital Camera

FIG. 1A is a view showing the configuration of a digital camera 100. The digital camera 100 is configured such that an image-forming optical system 120, an image sensor 101, a distance information generating apparatus 110, an image generating unit (not shown), an image signal storing unit (not shown), and an information storing unit 170 are disposed in a camera case 190. The distance information generating apparatus 110 can be configured by using a logic circuit such as an application-specific integrated circuit (ASIC). In addition, as another mode of the distance information generating apparatus 110, the distance information generating apparatus 110 may be constituted by a central processing unit (CPU) and a memory that stores an arithmetic processing program.

The image-forming optical system 120 is a photographing lens of the digital camera 100, and has a function of forming an image of an object on the image sensor 101. The image-forming optical system 120 is constituted by a plurality of lens groups (not shown), and has an exit pupil 130 at a position a predetermined distance from the image sensor 101. Note that, in the present specification, a z axis is parallel to an optical axis 140 of the image-forming optical system 120. In addition, an x axis and a y axis are perpendicular to each other, and are perpendicular to the optical axis.

Configuration of Image Sensor

The image sensor 101 is constituted by a complementary metal oxide semiconductor (CMOS) and a charge-coupled device (CCD), and has a ranging function by an imaging plane phase difference ranging method. The image sensor 101 is disposed on an estimated focal plane of the image-forming optical system 120. The object image formed on the image sensor 101 via the image-forming optical system 120 is subjected to photoelectric conversion by the image sensor 101, and an image signal based on the object image is generated. By performing development on the acquired image signal using the image generating unit, it is possible to generate a viewing image signal. In addition, it is possible to store a generated viewing image in the image signal storing unit. Hereinbelow, the image sensor 101 in the present embodiment will be described in greater detail by using FIG. 1B and FIGS. 2A to 2D.

Figure 1B:
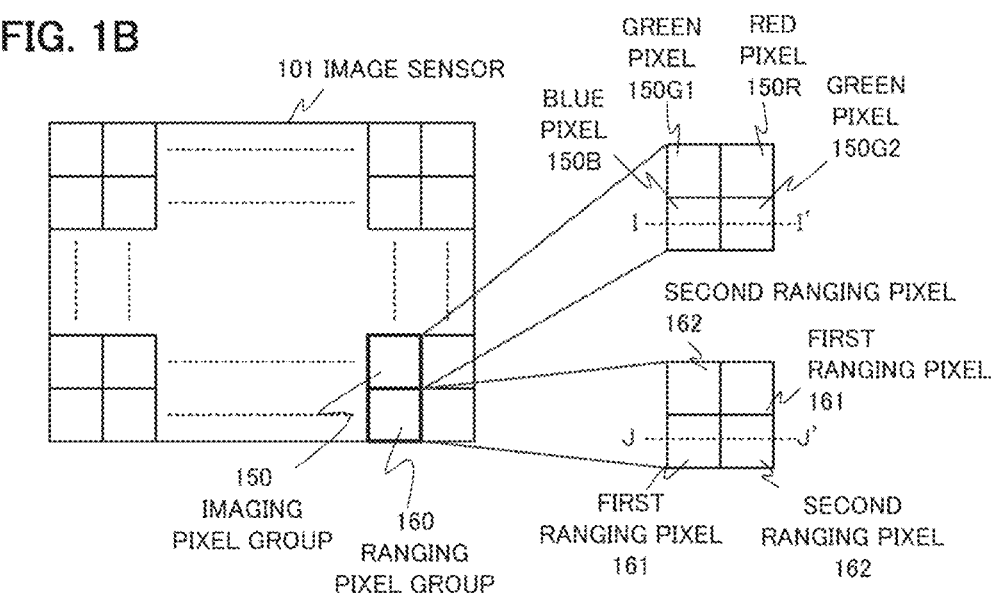

FIG. 1B is an xy cross-sectional view of the image sensor 101. The image sensor 101 is configured by disposing a plurality of imaging pixel groups 150 each having pixels arranged in two rows and two columns, and a plurality of ranging pixel groups 160 each having pixels arranged in two rows and two columns. The number of the imaging pixel groups 150 and the number of the ranging pixel groups 160 may be equal to each other, or one of the number of the imaging pixel groups 150 and the number of the ranging pixel groups 160 may be more than the other one thereof.

The imaging pixel group 150 includes a plurality of types of imagining pixels having different spectral sensitivity characteristics. Specifically, the imaging pixel group 150 is configured by disposing green pixels 150G1 and 150G2 diagonally, and disposing a red pixel 150R and a blue pixel 150B as the other two pixels. The imaging pixel group 150 outputs a color image signal (third image signal) that includes three pieces of color information that correspond to blue, green, and red.

The ranging pixel group 160 is configured by disposing first ranging pixels 161 diagonally, and disposing second ranging pixels 162 as the other two pixels. Each first ranging pixel 161 and each second ranging pixel 162 of the ranging pixel group 160 output a first image signal and a second image signal serving as ranging image signals.

Figure 2A:
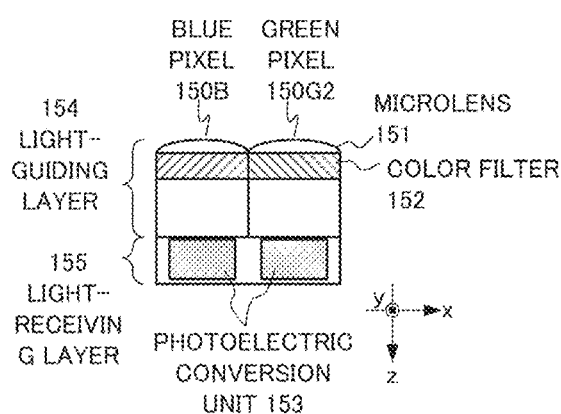
FIGS. 2A to 2D are views showing the configuration of an image sensor in the first embodiment.

FIG. 2A is a view schematically showing a I-I' cross section of the imaging pixel group 150. Each pixel is constituted by a light-guiding layer 154 and a light-receiving layer 155. In the light-guiding layer 154, a microlens 151 for efficiently guiding a light flux incident on the pixel to a photoelectric conversion unit, a color filter 152 for allowing passage of light in a predetermined wavelength band, and wiring (not shown) for image reading and pixel driving are disposed. Three types of the color filters 152 corresponding to blue, green, and red are used, and the spectral sensitivities of the blue pixel 150B, the green pixels 150G1 and 150G2, and the red pixel 150R have characteristics shown in FIG. 2B. In the light-receiving layer 155, a photoelectric conversion unit 153 for performing photoelectric conversion on received light is disposed.

Figure 2B:
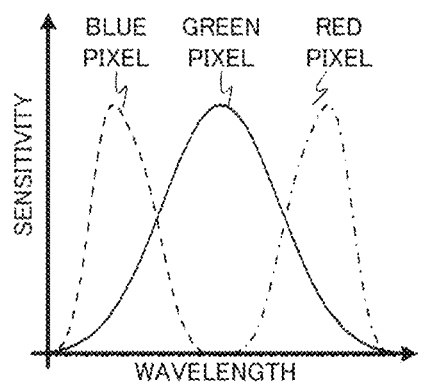
Figure 2C:
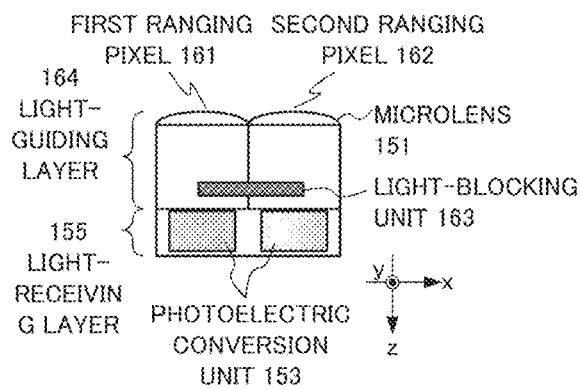
Figure 2D:
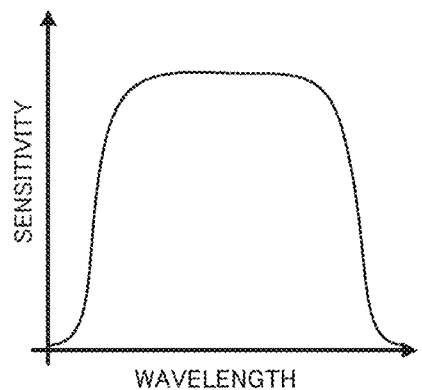

FIG. 2C is a view schematically showing a J-J' cross section of the ranging pixel group 160. In the light-receiving layer 155, the photoelectric conversion unit 153 is disposed. In a light-guiding layer 164, the microlens 151 for efficiently guiding the light flux incident on the pixel to the photoelectric conversion unit, a light-blocking unit 163 for limiting light incident on the photoelectric conversion unit 153, and wiring (not shown) for image reading and pixel driving are disposed. In the ranging pixel group 160, for increasing the amount of received light, the color filter is not disposed. The spectral sensitivity of the first ranging pixel 161 and the second ranging pixel 162 has spectral sensitivity characteristics obtained by multiplying the spectral sensitivity of the photoelectric conversion unit 153 by the spectral sensitivity of an infrared cut filter. FIG. 2D shows the spectral sensitivity of the first ranging pixel 161 and the second ranging pixel 162, and the first ranging pixel 161 and the second ranging pixel 162 have the spectral sensitivity equal to that obtained by adding up the spectral sensitivities of the blue pixel 150B, the green pixel 150G1, and the red pixel 150R.

Distance Measurement by Imaging Plane Phase Difference Ranging Method

A description will be given of the light flux received by each of the first ranging pixel 161 and the second ranging pixel 162 of the image sensor 101 of the present embodiment by using FIG. 3A.

Figure 3A:
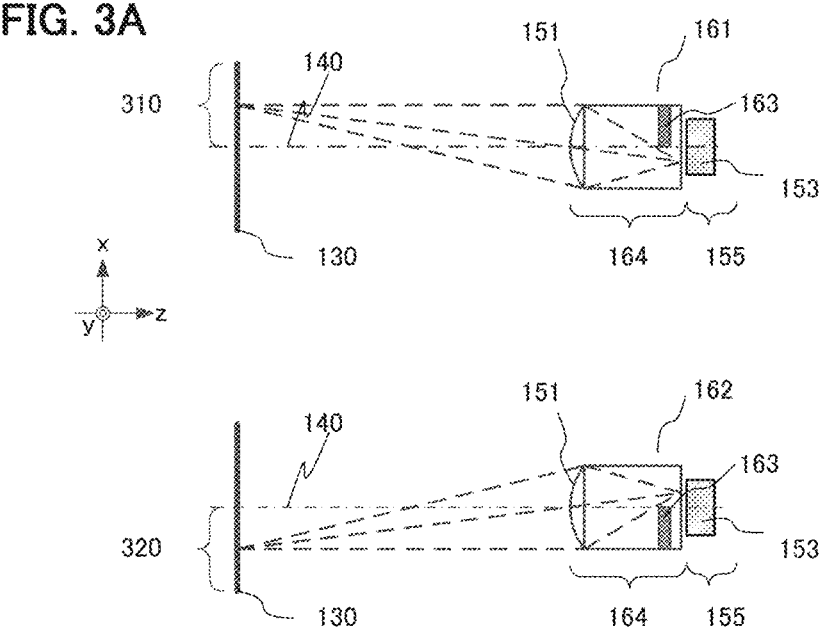
FIGS. 3A to 3D are views for explaining an imaging plane phase difference ranging method.

FIG. 3A is a schematic view showing the exit pupil 130 of the image-forming optical system 120, and the first ranging pixel 161 and the second ranging pixel 162 in the image sensor 101. The microlens 151 shown in FIG. 3A is disposed such that the exit pupil 130 and the light-receiving layer 155 are in an optically conjugate relation with each other. The light flux having passed through the exit pupil 130 of the image-forming optical system 120 is condensed by the microlens 151 and is guided to the photoelectric conversion unit 153, but part of the light is blocked by the light-blocking unit 163 in the light-guiding layer 164. As a result, as shown in FIG. 3A, the photoelectric conversion unit 153 of the first ranging pixel 161 mainly receives the light flux having passed through a first pupil area 310 in the exit pupil, and the photoelectric conversion unit 153 of the second ranging pixel mainly receives the light flux having passed through a second pupil area 320 in the exit pupil. In FIG. 3A, the first pupil area 310 and the second pupil area 320 are depicted so as to be completely different from each other for simplification, but these pupil areas may partially overlap each other as long as the pupil areas are at least partially different from each other.

Each of a plurality of the first ranging pixels 161 of the image sensor 101 mainly receives the light flux having passed through the first pupil area 310, and outputs the first image signal. At the same time, each of a plurality of the second ranging pixels 162 of the image sensor 101 mainly receives the light flux having passed through the second pupil area 320, and outputs the second image signal. From the first image signal, it is possible to obtain the intensity distribution of an image formed on the image sensor 101 by the light flux having passed through the first pupil area 320. In addition, from the second image signal it is possible to obtain the intensity distribution of an image formed on the image sensor 101 by the light flux having passed through the second pupil area 320.

Figure 3B:
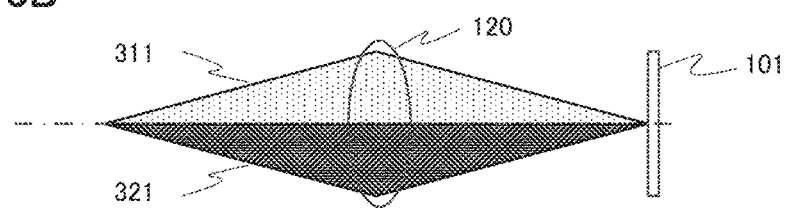
Figure 3C:
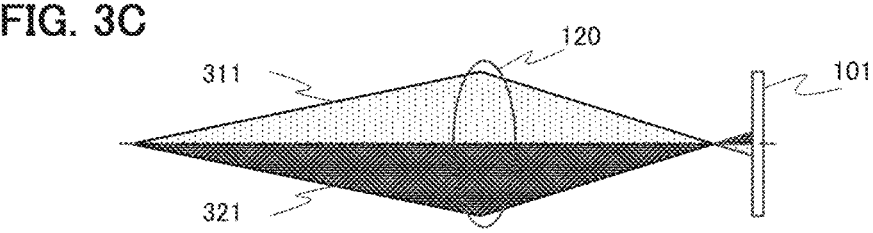
Figure 3D:
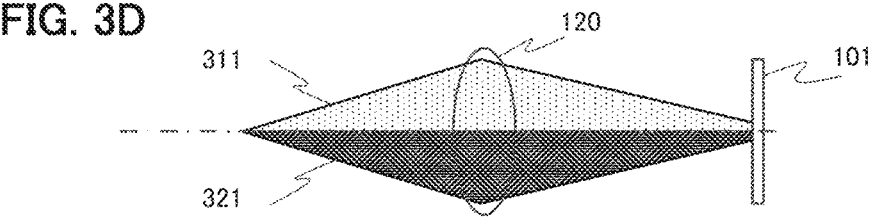

A relative positional shift amount (i.e., a parallax amount) between the first image signal and the second image signal has a value corresponding to a defocus amount (or an object distance). The relationship between the parallax amount and the defocus amount will be described by using FIGS. 3B, 3C, and 3D. Each of FIGS. 3B, 3C, and 3D is a schematic view showing the image sensor 101 and the image-forming optical system 120 of the present embodiment. In the drawings, the reference numeral 311 indicates a first light flux that passes through the first pupil area 310, and the reference numeral 321 indicates a second light flux that passes through the second pupil area 320.

FIG. 3B shows a state when focus is achieved, and the first light flux 311 and the second light flux 321 converge on the image sensor 101. At this point, the parallax amount between the first image signal formed by the first light flux 311 and the second image signal formed by the second light flux 321 is 0.

FIG. 3C shows a state of defocusing in a negative direction of the z axis on an image side. At this point, the parallax amount between the first image signal formed by the first light flux and the second image signal formed by the second light flux is not 0 but has a negative value.

FIG. 3D shows a state of defocusing in a positive direction of the z axis on the image side. At this point, the relative positional shift amount between the first image signal formed by the first light flux and the second image signal formed by the second light flux is not 0 but has a positive value.

From a comparison between FIG. 3C and FIG. 3D, it can be seen that the direction of the positional shift is switched according to whether the defocus amount is positive or negative. In addition, it can be seen that the positional shift corresponding to the image-forming relationship (geometric relationship) of the image-forming optical system occurs according to the defocus amount. It is possible to detect the parallax amount that is the positional shift between the first image signal and the second image signal by an area-based matching method described later.

Figure 6:
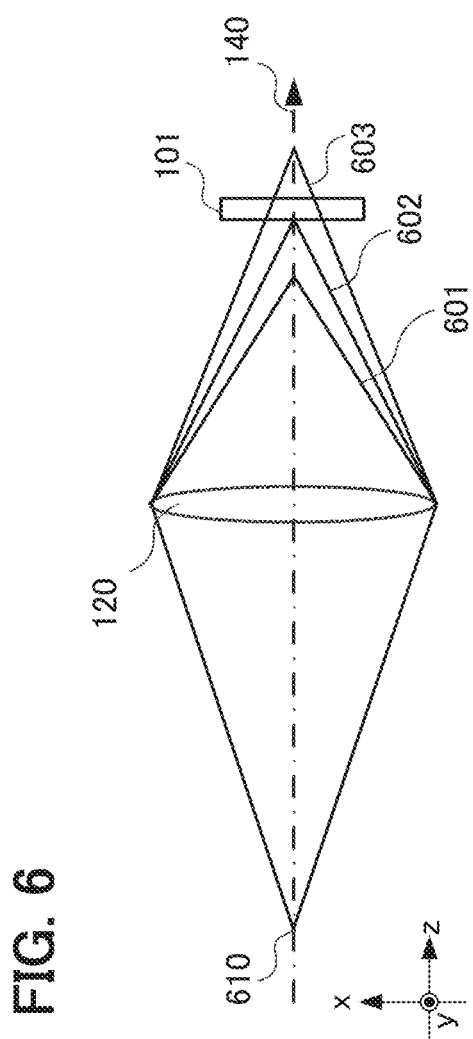
FIG. 6 is a view for explaining axial chromatic aberration of an image-forming optical system.

The image-forming optical system 120 has chromatic aberration. FIG. 6 is a schematic view for explaining axial chromatic aberration of the image-forming optical system 120. The reference numeral 601 indicates the light flux of a blue wavelength range, the reference numeral 602 indicates the light flux of a green wavelength range, and the reference numeral 603 indicates the light flux of a red wavelength range. Light emitted from an object point 610 is condensed by the image-forming optical system 120, and forms an image at a position corresponding to the wavelength, as shown in FIG. 6. Consequently, when the detected parallax amount is converted into the defocus amount or a distance from the digital camera 100 to the object (object distance), it is necessary to correct the axial chromatic aberration by using a correcting method described later.

Description of Distance Information Generating Apparatus

Figure 4D:
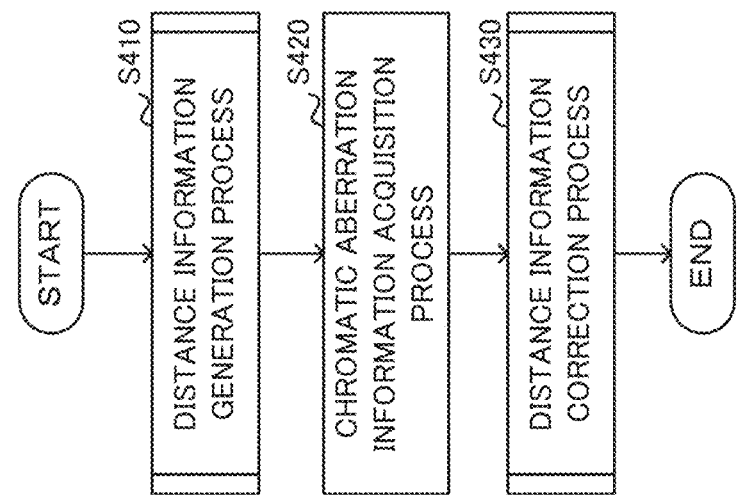
Figure 4C:
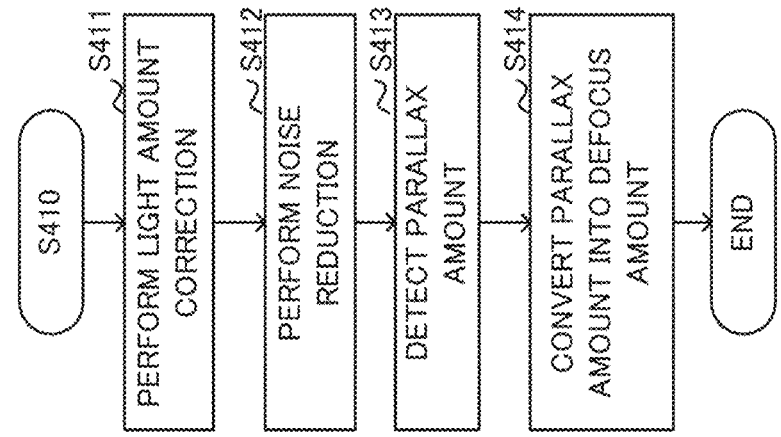
Figure 4B:
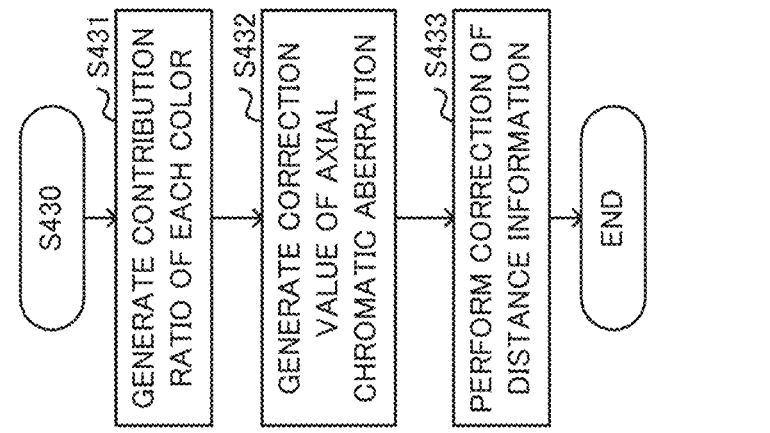

The distance information generating apparatus of the present embodiment will be described. FIG. 4A is a block diagram showing the schematic configuration of a distance information generating apparatus 110 of the present embodiment, and FIGS. 4B to 4D are flowcharts showing the operation of the distance information generating apparatus 110.

The distance information generating apparatus 110 generates distance information Ird in a distance information generating unit 410, and acquires chromatic aberration information Ico of the image-forming optical system 120 in a chromatic aberration information acquiring unit 420. In addition, the distance information generating apparatus 110 generates corrected distance information Icd by performing correction of the distance information Ird in a distance information correction unit 430, and outputs the corrected distance information Icd.

Hereinbelow, a description will be given of process details performed in the distance information generating unit 410, the chromatic aberration information acquiring unit 420, and the distance information correction unit 430.

In a distance information generation process S410, the distance information generating unit 410 acquires a first image signal S1 and a second image signal S2 from the image sensor 101 or the image signal storing unit, and generates the distance information Ird indicative of the object distance by the distance information generation process S410. Hereinbelow, the specific process details in the distance information generation process S410 will be described on the assumption that the defocus amount is generated as the distance information Ird by using FIG. 4C.

In Step S411, the distance information generating unit 410 performs light amount correction of the first image signal S1 and the second image signal S2. In the peripheral angle of view of the image-forming optical system 120, light amount balance between the first image signal S1 and the second image signal S2 breaks down by vignetting due to a difference in shape between the first pupil area 310 and the second pupil area 320. In Step S411, the light amount correction of the first image signal S1 and the second image signal S2 is performed by using a light amount correction value stored in the information storing unit 170. Note that the light amount correction value stored in the information storing unit 170 does not necessarily need to be used and, e.g., the light amount correction may be performed after the light amount correction value is generated from the ratio of areas of the first pupil area 310 and the second pupil area 320 in Step S411.

In Step S412, a process for reducing a noise added in the image sensor 101 is performed. Specifically, a filtering process that uses a band-pass filter is performed on the first image signal S1 and the second image signal S2. In general, in a high frequency range having a high spatial frequency, an SN ratio (a ratio between a signal component and a noise component) is low, and the noise component is relatively increased. Consequently, it is possible to use a so-called low-pass filter that reduces transmittance as the frequency is higher. Note that the light amount correction in Step S411 does not necessarily result in a design value due to a manufacturing error of the image-forming optical system 120 or the like. Consequently, it is desirable to use a band-pass filter that has the transmittance of a DC component (a component that satisfies spatial frequency=0) of 0, and has low transmittance of a high frequency component.

In Step S413, the distance information generating unit 410 calculates the parallax amount between the first image signal S1 and the second image signal S2. Specifically, the distance information generating unit 410 sets an attention point in the first image signal S1, and sets a check area having the attention point at its center. The check area is, e.g., a rectangle (including a square) having a predetermined number of pixels on a side and having the attention point at its center. Next, the distance information generating unit 410 sets a reference point in the second image signal S2, and sets a reference area having the reference point at its center. The reference area is equal in size and shape to the check area. The distance information generating unit 410 calculates a degree of correlation between the first image signal S1 included in the check area and the second image signal S2 included in the reference area while sequentially moving the reference point, and sets the reference point having the highest degree of correlation as a correspondence point corresponding to the attention point. The relative positional shift amount between the attention point and the correspondence point is the parallax amount at the attention point. The distance information generating unit 410 can calculate the parallax amounts at a plurality of pixel positions by calculating the parallax amount while sequentially moving the attention point. As the calculation method of the degree of correlation, it is possible to use known methods. For example, it is possible to use a method called normalized cross-correlation (NCC) that evaluates normalized cross-correlation between image signals, sum of squared difference (SSD) that evaluates the sum of squares of a difference between image signals, or sum of absolute difference (SAD) that evaluates the sum of absolute values of a difference.

In Step S414, the distance information generating unit 410 converts the parallax amount into the defocus amount that corresponds to a distance from the image sensor 101 to the focal point of the image-forming optical system 120 by using a predetermined conversion coefficient. When the predetermined conversion coefficient is K, the defocus amount is $\Delta L$, and the parallax amount is d, it is possible to convert the parallax amount d into the defocus amount $\Delta L$ by the following Expression (1).

$$\Delta L = K \times d \quad (1)$$

It is possible to generate the distance information Ird that includes the defocus amounts at a plurality of pixel positions as the distance information by performing the distance information generation process S410 at a plurality of pixel positions.

The chromatic aberration information acquiring unit 420 acquires the chromatic aberration information Ico serving as information related to the chromatic aberration amount of the image-forming optical system 120 from the information storing unit 170 by a chromatic aberration information acquisition process S420. In the information storing unit 170, as the chromatic aberration information Ico, chromatic aberration information Icob for the blue wavelength range, chromatic aberration information Icog for the green wavelength range, and chromatic aberration information Icor for the red wavelength range are stored. As the chromatic aberration information Icob for the blue wavelength range, it is possible to use an axial chromatic aberration amount obtained by weighted average (weighted mean) processing using the spectral sensitivity characteristic of the blue pixel 150B (FIG. 2B). Similarly, as each of the chromatic aberration information Icog for the green wavelength range and the chromatic aberration information Icor for the red wavelength range, the axial chromatic aberration amount obtained by the weighted mean processing using the spectral sensitivity characteristic of the pixel corresponding to each wavelength range (the green pixel 150G1 for the green wavelength range, the red pixel 150R for the red wavelength range) is appropriately used. Note that the axial chromatic aberration amount of the image-forming optical system 120 may be a relative distance from the best focus position of a predetermined wavelength. As the predetermined wavelength, it is possible to choose, e.g., a wavelength that maximizes luminous efficacy or a wavelength having the highest spectral sensitivity of the green pixel 150G1.

The description has been given on the assumption that the chromatic aberration information acquiring unit 420 acquires the chromatic aberration information Ico from the information storing unit 170, but the chromatic aberration information acquiring unit 420 may acquire the chromatic aberration information Ico from other information sources.

For example, in the case where the imaging apparatus 100 uses an interchangeable lens (the image-forming optical system 120) and the chromatic aberration information Ico is stored in the interchangeable lens, the chromatic aberration information acquiring unit 420 may acquire the chromatic aberration information Ico from the interchangeable lens. Alternatively, the chromatic aberration information acquiring unit 420 may acquire the chromatic aberration information Ico of the image-forming optical system 120 from an external apparatus by communication (wireless or wired communication).

In a distance information correction process S430, the distance information correction unit 430 performs the correction of the distance information Ird to generate the corrected distance information Icd. In order to perform the correction of the distance information Ird, the distance information correction unit 430 uses the distance information Ird acquired from the distance information generating unit 410, the chromatic aberration information Ico acquired from the chromatic aberration information acquiring unit 420, and a color image signal S3 acquired from the image sensor 101. Hereinbelow, the specific process details in the distance information correction unit 430 will be described by using FIG. 4D.

In Step S431, the distance information correction unit 430 calculates a contribution ratio indicative of the degree of contribution when the distance information Ird is generated for each of the blue wavelength range, the green wavelength range, and the red wavelength range. Color information having larger contrast change along the direction of occurrence of the parallax between the first image signal S1 and the second image signal S2 (an x direction in the present embodiment) has a higher contribution ratio. In order to evaluate the magnitude of the contrast change of blue, an image signal formed by the blue pixel 150B is extracted from the color image signal S3, and a magnitude Cb of the contrast change is generated. Similarly, magnitudes Cg and Cr of the contrast change are sequentially generated for an image signal formed by the green pixels 150G1 and 150G2 and an image signal formed by the red pixel 150R. By using the magnitudes Cb, Cg, and Cr of the contrast change of individual pieces of color information, the contribution ratio of each piece of color information is generated by the following Expression (2). Contribution ratios CTBb, CTBg, and CTBr of the individual pieces of color information correspond to contrast evaluation values.

contribution ratio $CTBb$ of blue wavelength range$=Cb/(Cb+Cg+Cr)$ contribution ratio $CTBg$ of green wavelength range$=Cg/(Cb+Cg+Cr)$ contribution ratio $CTBr$ of red wavelength range$=Cr/(Cb+Cg+Cr)$ (2)

Next, a generating method of the magnitudes (Cb, Cg, Cr) of the contrast change will be specifically described. Hereinbelow, the description will be made by using, as an example, the case where the magnitude Cb of the contrast change is generated for an image signal S3b formed by the blue pixel 150B.

First, an attention point is set in the image signal S3b, and a check area having the attention point at its center is set. The check area set in this process desirably has the same area size as that of the check area used in Step S413.

A signal string along the x direction is extracted from the image signal S3b included in the check area, and the standard deviation of a pixel value is calculated. A plurality of the standard deviations are determined by sequentially moving a position where the signal string is extracted in a y direction in the check area. The sum (or arithmetic mean) of the plurality of standard deviations is set as the magnitude Cb of the contrast change corresponding to the blue wavelength range. By performing the same process on the image signal formed by the green pixels 150G1 and 150G2 and the image signal formed by the red pixel 150R, it is possible to generate the magnitudes Cg and Cr of the contrast change.

Note that, in Step S431, it is desirable to extract the signal string along the x direction and generate the standard deviation of the pixel value. This is because the position of the center of gravity of the first pupil area 310 and the position of the center of gravity of the second pupil area 320 are decentered along the x direction, and hence it is desirable to limit the direction in which the magnitude of the contrast change is to be evaluated to the x direction. In other words, it is preferable to use the signal string along the direction of occurrence of the parallax (i.e., the direction of decentering of the first and second pupil areas) for the generation of the standard deviation. The direction of occurrence of the parallax can be expressed as a search direction when the parallax is determined. The y direction is orthogonal to the x direction. In the case where the direction of occurrence of the parallax is different from that in the present embodiment, the direction is appropriately adjusted.

In Step S432, the distance information correction unit 430 generates a correction value Cdef for correcting the axial chromatic aberration by using the chromatic aberration information Ico acquired from the chromatic aberration information acquiring unit 420 and the contribution ratios (CTBb, CTBg, CTBr) from the individual pieces of color information. Specifically, a value obtained by combining pieces of the chromatic aberration information (Icob, Icog, Icor) of the individual wavelength ranges included in the chromatic aberration information Ico by using the contribution ratios of the corresponding wavelength ranges as weights is determined to be the correction value Cdef That is, as shown in the following Expression (3), the correction value Cdef is generated as a weighted average value of the pieces of the chromatic aberration information Icob, Icog, and Icor with the contribution ratios CTBb, CTBg, and CTBr of the individual pieces of color information used as weighting coefficients.

correction value $Cdef=Icob \times CTBb+Icog \times CTBg+Icor \times CTBr$ (3)

In Step S433, the distance information correction unit 430 performs the correction of the distance information Ird generated by the distance information generating unit 410 by using the correction value Cdef generated in Step S432 to generate the corrected distance information Icd. The correction value Cdef is a value obtained by performing the weighted average processing on the axial chromatic aberration amount having a predetermined wavelength as a reference by using the contribution ratios of the individual wavelength ranges. Further, the distance information Ird includes the defocus amount. Consequently, it is possible to use a value obtained by subtracting the correction value Cdef from the distance information Ird as the corrected distance information Icd. That is, it is possible to determine the corrected distance information Icd in accordance with the following Expression (4).

corrected distance information $Icd=Ird-Cdef$ (4)

The distance information correction unit 430 of the present embodiment corrects an influence resulting from the focus position that differs from one color to another due to the axial chromatic aberration, and generates the value corrected such that objects at the same object distance have the same defocus amount as the corrected distance information Icd. Note that the defocus amount after the axial chromatic aberration is corrected in the distance information correction unit 430 may be generated as the corrected distance information Icd after being converted into the distance from the digital camera 100 to the object by using the image-forming relationship of the image-forming optical system 120. Since the axial chromatic aberration is already corrected, the paraxial amount of the image-forming optical system 120 is appropriately used in the conversion from the defocus amount to the object distance.

Reason for Use of Magnitude of Contrast Change in Calculation of Contribution Ratio A description will be given of a reason why it is preferable to use the magnitude of the contrast change when the contribution ratio of each wavelength range is calculated.

It is assumed that each of the first image signal S1 and the second image signal S2 acquired in the image sensor 101 can be separated as represented by the following Expression (5).

$$S1 = A1 + A2$$

$$S2 = B1 + B2 \quad (5)$$

It is assumed that an image signal A1 and an image signal B1 are a pair of image signals in a wavelength range 1, and have a parallax amount d1. In addition, it is assumed that an image signal A2 and an image signal B2 are a pair of image signals in a wavelength range 2, and have a parallax amount d2.

The sum of squared difference (SSD) is used to evaluate correlation between the first image signal S1 and the second image signal S2. Since the image signal A1 and the image signal B1 have the parallax amount d1, an SSD value SSD1 between the two image signals is given by Expression (6).

[Math. 1]

$$SSD1(k) = \sum_{i,j \in W} \{B1(i, j-k) - A1(i, j)\}^2 = a_1(k - d_1)^2 \quad (6)$$

Further, since the image signal A2 and the image signal B2 has the parallax amount d2, an SSD value SSD2 between the two image signals is given by Expression (7).

[Math. 2]

$$SSD2(k) = \sum_{i,j \in W} \{B2(i, j-k) - A2(i, j)\}^2 = a_2(k - d_2)^2 \quad (7)$$

In Expression (6) and Expression (7), d1 and d2 indicate the parallax amounts in the individual pairs of the image signals. Since the SSD value is the sum of squares of the difference between the image signals, a1 is proportional to the square of the magnitude of the contrast change of at least one of the image signal A1 and the image signal B1. Similarly, a2 is proportional to the square of the magnitude of the contrast change of at least one of the image signal A2 and the image signal B2.

Considering that the image signal S1 is a combined image of the image signal A1 and the image signal A2 and the image signal S2 is a combined image of the image signal B1 and the image signal B2, the SSD value between the first image signal S1 and the second image signal S2 can be approximated as in the following Expression (8).

[Math. 3]

$$SSD(k) = \sum_{i,j \in W} \{S2(i, j-k) - S1(i, j)\}^2 \quad (8)$$

$$\approx \left[ \sqrt{\sum_{i,j \in W} \{B1(i, j-k) - A1(i, j)\}^2} + \sqrt{\sum_{i,j \in W} \{B2(i, j-k) - A2(i, j)\}^2} \right]^2$$

Herein, when Expression (6) and Expression (7) are substituted into Expression (8), the following Expression (9) is obtained.

[Math. 4]

$$SSD(k) = (\sqrt{a_1} + \sqrt{a_2})^2 \left( k - \frac{d_1 \sqrt{a_1} + d_2 \sqrt{a_2}}{\sqrt{a_1} + \sqrt{a_2}} \right)^2 \quad (9)$$

As can be seen from Expression (9), the parallax of images obtained by combining the pair of the image signals A1 and B1 having the parallax amount d1 together and combining the pair of the image signals A2 and B2 having the parallax amount d2 together has a value obtained by combining the parallax amount d1 and the parallax amount d2 together at a combination ratio of $a_1^{1/2}$ and $a_2^{1/2}$. Herein, $a_1^{1/2}$ is the magnitude of the contrast change of the image signal A1, $a_2^{1/2}$ is the magnitude of the contrast change of the image signal A2, and both of them are values having the same dimension as that of the image signal. That is, when the contribution ratio of each wavelength range is calculated, as described in Step S431, it can be seen that the magnitude of the contrast change calculated by using the standard deviation of the signal string included in the check area is appropriately used. Note that, in the above description, the SSD is used to evaluate the correlation between the image signals. However, in the case where the SAD or NCC is used as well, it is possible to calculate the combination ratio by using the magnitude of the contrast change similarly.

Figure 10A:
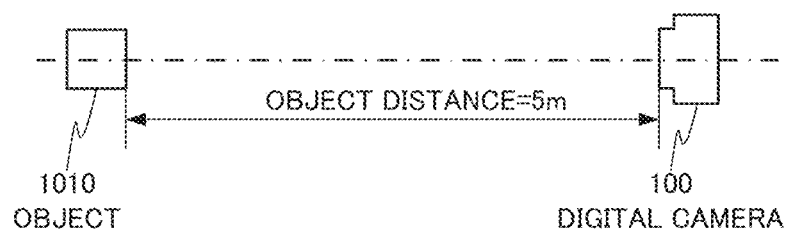
FIGS. 10A to 10C are views for explaining an effect of reducing a chromatic aberration error.
Figure 10B:
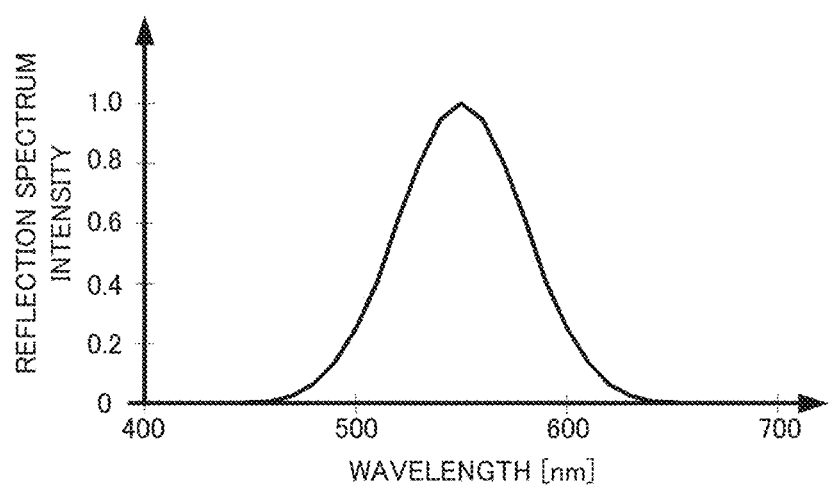
Figure 10C:
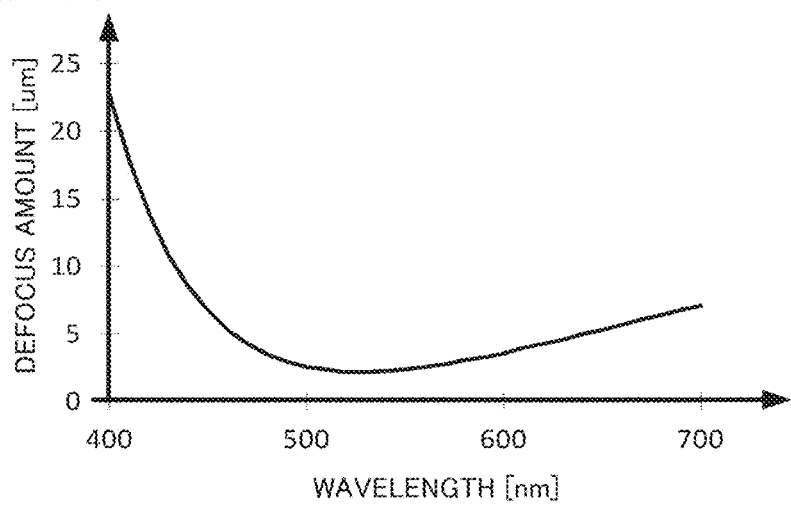

FIGS. 10A to 10C are views for explaining an effect of reducing a chromatic aberration correction error by the distance information generating apparatus of the present embodiment. FIG. 10A shows the digital camera 100 and an object 1010 serving as a photographing target. The object 1010 is disposed at a position 5 m from the digital camera 100. FIG. 10B shows the reflection spectrum of the object 1010. In FIG. 10B, the horizontal axis indicates the wavelength, and the vertical axis indicates a value normalized such that the reflection spectrum satisfies the maximum value=1. FIG. 10C shows the defocus amount of the image-forming optical system 120 when the object 1010 is taken on the digital camera 100. At this point, when the correction of the chromatic aberration is performed by using the ratio of the pixel value of the blue pixel, the pixel value of the green pixel, and the pixel value of the red pixel as in a conventional case, an estimated object distance is 4.86 m, and an error of 2.7% occurs. On the other hand, in the correction of the chromatic aberration by the distance information generating apparatus 110 of the present embodiment, a corrected object distance is 4.95 m that corresponds to an error of 1.1%, and it is possible to reduce the error as compared with the conventional case. Thus, the distance information generating apparatus 110 of the present embodiment can reduce the error caused by the chromatic aberration of the image-forming optical system 120 by generating the contribution ratio of each wavelength by using the magnitude of the contrast change of each wavelength range. Note that the focal length of the image-forming optical system 120 of the digital camera 100 is 14 mm, and the digital camera 100 is focused on the position that satisfies the object distance=5.3 m.

In order to generate the contribution ratio of each wavelength with high accuracy, it is desirable to evaluate the magnitude of the contrast change by using a value linearly proportional to the pixel value. In the above description, the magnitude of the contrast change is evaluated by using the standard deviation, but a value obtained by addition of an absolute value subjected to processing using a primary differential filter in the x direction in the check area may also be used. However, considering pixel defect in the image sensor 101 and an influence of a noise resulting from low illuminance, it is desirable to use a value based on a statistic such as the standard deviation. In the image sensor 101 of the present embodiment, the ranging pixel group 160 for generating the distance information and the imaging pixel group 150 for generating the color information are disposed at different pixel positions. Consequently, in the distance information correction unit 430, the contribution ratio of each wavelength range may be calculated after the color information in the ranging pixel group 160 is generated by an interpolation process (e.g., bilinear interpolation or bicubic interpolation) of the color image signal S3.

The distance information generating apparatus 110 of the present embodiment corrects the influence of the chromatic aberration of the image-forming optical system 120 by using the contribution ratio of each wavelength range generated by using the color image signal S3. Consequently, it is not necessary to calculate the distance information for each piece of color information, and it is possible to generate the distance information with a smaller computation amount. In addition, since the distance information is generated by using the image signal in which pieces of color information of the individual wavelength ranges are combined, the influence of the noise added in the image sensor is small, and it is possible to generate the distance information having high accuracy. That is, the distance information generating apparatus 110 of the present embodiment can generate the distance information having high accuracy with the small computation amount.

Modification of Distance Information Generating Apparatus 110

Depending on the chromatic aberration of the image-forming optical system 120, there are cases where the position and size of the exit pupil differs from one wavelength range to another. In these cases, not only the focus position but also the coefficient for converting the parallax amount into the defocus amount differs from one wavelength range to another.

The distance information correction unit 430 in the present embodiment may correct not only the influence of the focus position that differs from one wavelength to another, but also the influence of the coefficient for convening the parallax amount into the defocus amount that differs from one wavelength to another.

Figure 5B:
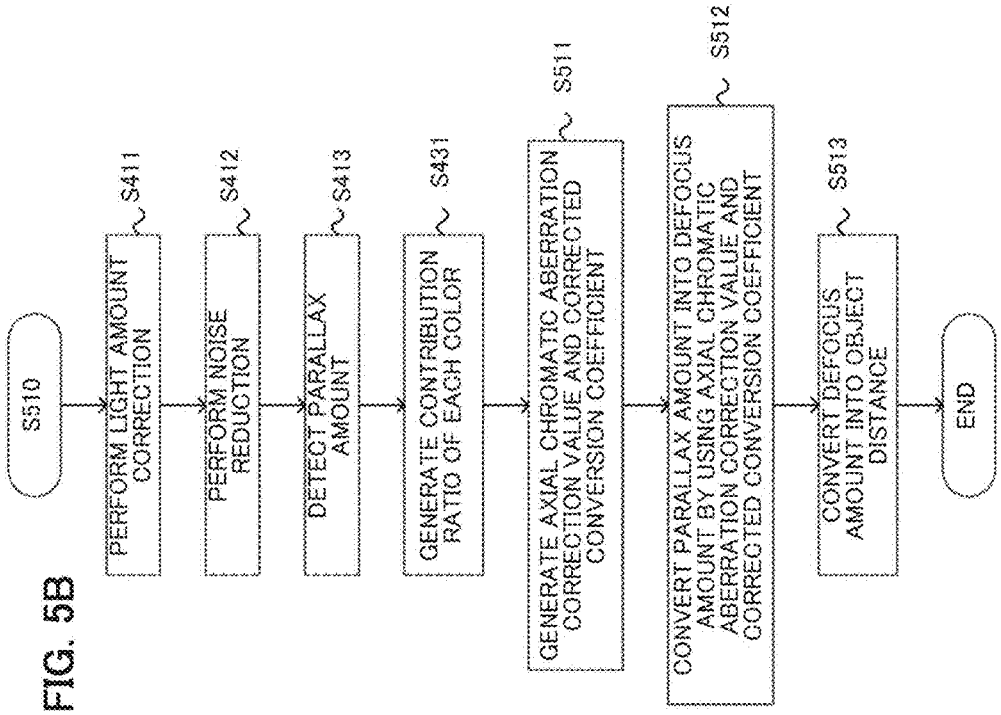
FIGS. 5A and 5B are views for explaining a distance information generating (correcting) method in a modification.
Figure 5A:
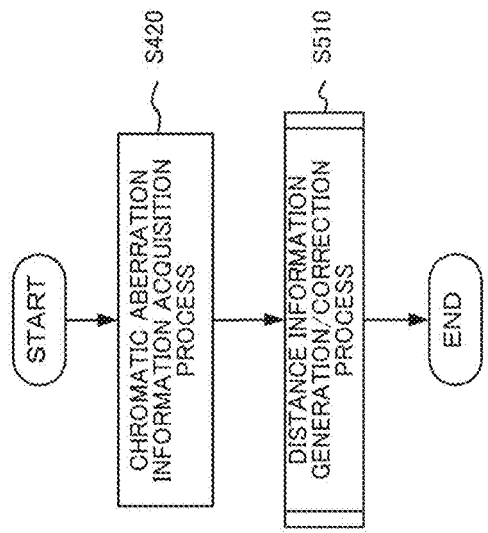

Hereinbelow, a description will be give of process details in the case where the distance information correction unit 430 also corrects the coefficient (conversion coefficient) for converting the parallax amount into the defocus amount. FIG. 5A is a flowchart showing the operation of the distance information generating apparatus 110 in the present modification.

In the present modification, the chromatic aberration information acquiring unit 420 acquires the chromatic aberration information Ico from the information storing unit 170 first in Step S420. The information storing unit 170 according to the present modification stores two pieces of information for each wavelength range as the chromatic aberration information Ico. The first piece of information is the axial chromatic aberration amount, and the second piece of information is the conversion coefficient for converting the parallax amount into the defocus amount. That is, the information storing unit 170 stores the information related to the conversion coefficient of each wavelength range in addition to the chromatic aberration information (Icab, Icag, Icar) related to the axial chromatic aberration amount of each wavelength range. Examples of the information related to the conversion coefficient of each wavelength range include a conversion coefficient Kb of the blue wavelength range, a conversion coefficient Kg of the green wavelength range, and a conversion coefficient Kr of the red wavelength range.

Next, in a distance information generation correction process S510, the distance information generating apparatus 110 generates the distance information. In the distance information generation correction process S510, the distance information correction unit 430 converts the parallax amount d into the distance information Ird after correcting the conversion coefficient K in consideration of the chromatic aberration information, and further corrects the distance information Ird in consideration of the axial chromatic aberration to generate the corrected distance information Icd. Hereinbelow, a description will be given of specific process details in the distance information correction unit 440 by using FIG. 5B. Note that Steps S411 to S413 and Step S431 are the same as processes designated by the same reference numerals in FIGS. 4C and 4D, and hence the process details in and after Step S511 will be described.

In Step S511, the distance information correction unit 430 performs the calculation of the axial chromatic aberration correction value and the correction of the conversion coefficient. Similarly to the above-described process, the calculation of the axial chromatic aberration correction value Cdef is performed in accordance with Expression (3). A conversion coefficient Kc after the correction is determined in accordance with the following Expression (10) by using the chromatic aberration information Ico acquired from the chromatic aberration information acquiring unit 420 and the contribution ratios (CTBb, CTBg, CTBr) of the individual pieces of color information generated in Step S511.

$$\text{corrected conversion coefficient } Kc = Kb \times CTBb + Kg \times CTBg + Kr \times CTBr \quad (10)$$

In Step S512, the distance information correction unit 430 converts the parallax amount into the defocus amount ΔL while correcting the influence of the chromatic aberration. Specifically, the distance information correction unit 430 determines the defocus amount ΔL by the following Expression (11) by using the axial chromatic aberration correction value Cdef and the corrected conversion coefficient Kc generated in Step S511.

$$\Delta L = Kc \times d - Cdef \quad (11)$$

In Step S513, the distance information correction unit 430 converts the defocus amount into the object distance. The conversion from the defocus amount to the object distance can be performed by using the image-forming relationship of the image-forming optical system 120. For example, the defocus amount can be converted into the object distance by using the focal length and the principal point position of the image-forming optical system 120.

Note that, in general, the image-forming optical system 120 has field curvature that differs from one wavelength range to another. Consequently, the chromatic aberration information acquiring unit 420 of the distance information generating apparatus 110 of the present embodiment may acquire the chromatic aberration information Ico that includes dependence on the angle of view (e.g., the field curvature) of the image-forming optical system 120 of each wavelength range from the information storing unit 170. In this case, the distance information correction process is appropriately performed at each pixel position.

Second Embodiment

Hereinbelow, a second embodiment of the present invention will be described in detail with reference to the drawings. In the following description, a digital camera will be used as an example of the imaging apparatus that includes a distance information generating apparatus of the present embodiment, but the application of the present invention is not limited thereto. Note that, in the description based on the reference to the drawings, the same parts are designated by the same reference numerals in principle even when they are shown in different drawings in order to avoid the repetitive description as much as possible.

The digital camera 100 of the present embodiment is configured such that the image-forming optical system 120, an image sensor 701, a distance information generating apparatus 710, an image generating unit (not shown), a lens driving controlling unit (not shown), and an image signal storing unit (not shown) are disposed in the camera case 190. That is, as compared with the first embodiment (FIG. 1), the digital camera 100 of the present embodiment includes the image sensor 701 instead of the image sensor 101. Further, the digital camera 100 includes the distance information generating apparatus 710 instead of the distance information generating apparatus 110. The distance information generating apparatus 710 can be configured by using a logic circuit. As another mode of the distance information generating apparatus 710, the distance information generating apparatus 710 may also be constituted by a central processing unit (CPU) and a memory that stores an arithmetic processing program.

Configuration of Image Sensor

The image sensor 701 is constituted by the complementary metal oxide semiconductor (CMOS) and the charge-coupled device (CCD), and has the ranging function by the imaging plane phase difference ranging method. The object image formed on the image sensor 701 via the image-forming optical system 120 is subjected to photoelectric conversion by the image sensor 701, and the image signal based on the object image is generated. By performing the development on the acquired image signal using the image generating unit, it is possible to generate the viewing image signal. In addition, it is possible to store the generated viewing image in the image signal storing unit. Hereinbelow, the image sensor 701 in the present embodiment will be described in greater detail by using FIGS. 7A and 7B.

Figure 7A:
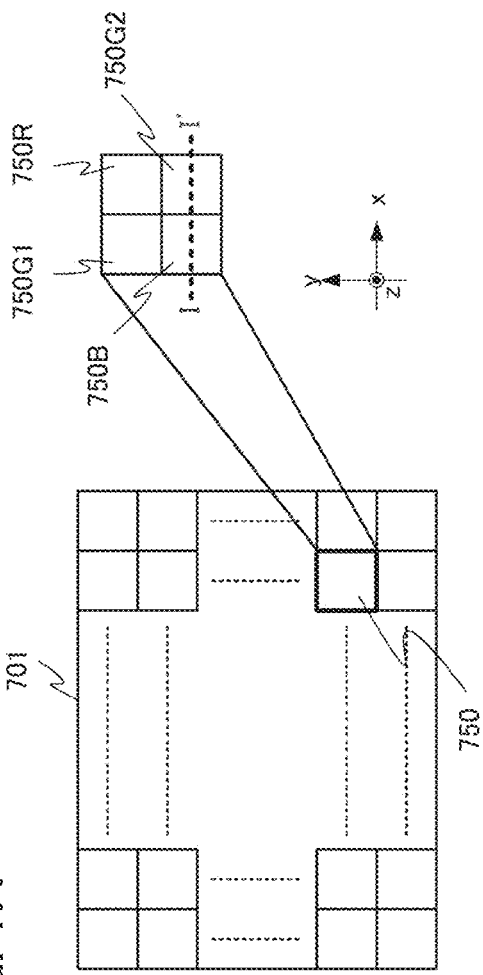
FIGS. 7A and 7B are views showing the configuration of an image sensor in a second embodiment.

FIG. 7A is an xy cross-sectional view of the image sensor 701. The image sensor 701 in FIG. 7A is configured by disposing a plurality of pixel groups 750 each having pixels arranged in two rows and two columns. In the pixel group 750, green pixels 750G1 and 750G2 are disposed diagonally, and a red pixel 750R and a blue pixel 750B are disposed as the other two pixels.

Figure 7B:
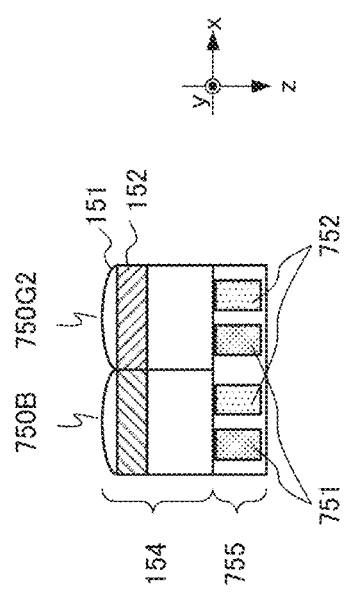

FIG. 7B is a view schematically showing a I-I' cross section of the pixel group 750. In each pixel, two photoelectric conversion units (a first photoelectric conversion unit 751 and a second photoelectric conversion unit 752) for performing photoelectric conversion on received light are disposed in a light-receiving layer 755. The microlens 151 is disposed such that the exit pupil 130 and the light-receiving layer 755 are in an optically conjugate relation with each other. As a result, the first photoelectric conversion unit 751 mainly receives the first light flux 311, and the second photoelectric conversion unit 752 mainly receives the second light flux 321.

The first photoelectric conversion unit 751 performs photoelectric conversion on the received light flux to generate an electric signal. Similarly, the second photoelectric conversion unit 752 performs photoelectric conversion on the received light flux to generate an electric signal. With the set of the electric signals generated by the first photoelectric conversion units 751 of the individual pixels of the image sensor 701, a third image signal is generated. Similarly, with the set of the electric signals generated by the second photoelectric conversion units 752 of the individual pixels of the image sensor 701, a fourth image signal is generated. It is possible to obtain the intensity distribution of an image formed on the image sensor 701 by the first light flux 311 from the third image signal, and it is possible to obtain the intensity distribution of an image formed on the image sensor 701 by the second light flux 321 from the fourth image signal. In addition, the pixel group 750 includes color filters corresponding to the blue, green, and red wavelength ranges, and hence each of the third image signal and the fourth image signal includes three pieces of color information. That is, in the image sensor 701 of the present embodiment, each pixel has an imaging function and the ranging function.

Description of Distance Information Generating Apparatus

Figure 8A:
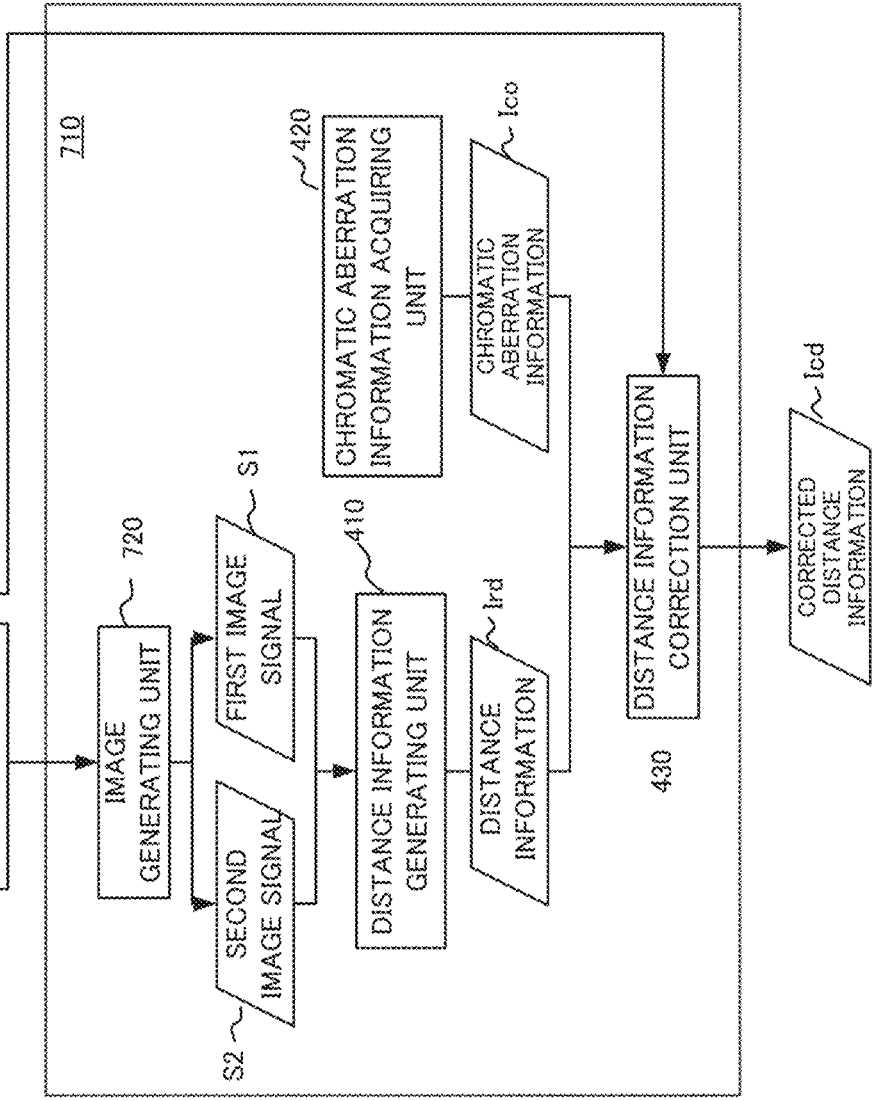

The distance information generating apparatus of the present embodiment will be described. FIG. 8A is a block diagram showing the schematic configuration of the distance information generating apparatus 710 of the present embodiment, and FIG. 8B is a flowchart showing the operation of the distance information generating apparatus 710.

As compared with the distance information generating apparatus of the first embodiment, the distance information generating apparatus 710 additionally includes an image generating unit 720. The distance information generating apparatus 710 acquires a third image signal S3 and a fourth image signal S4 from the image sensor 701, and generates and outputs the corrected distance information Icd obtained by correcting the distance information Ird.

Process details performed by the distance information generating unit 410, the chromatic aberration information acquiring unit 420, and the distance information correction unit 430 are the same as those in the first embodiment, and hence the description thereof will be omitted. Hereinbelow, process details performed by the image generating unit 720 will be described.

The image generating unit 720 acquires the third image signal S3 and the fourth image signal S4 from the image sensor 701, and generates a first image signal S1 and a second image signal S2 by an image generation process S720. Hereinbelow, by using FIG. 8C, a description will be given of the process details of the image generation process S720 in the image generating unit 720.

In Step S721, the image generating unit 720 performs demosaicing of the third image signal S3 and the fourth image signal S4. In order to generate a blue image signal the pixel value of the image signal is generated by interpolation that uses the luminance value of the adjacent blue pixel 150B for each of the pixel positions that do not have the blue pixel value (the pixel positions of the red pixel 150R, the green pixel 150G1, and the green pixel 150G2). For each of the green pixel and the red pixel, the image signal of each wavelength range is generated by using the interpolation process similarly. As the interpolation process, it is possible to use, e.g., bilinear interpolation or bicubic interpolation. The image signal including the color information of three channels of blue, green, and red is generated at each pixel position by demosaicing.

In Step S722, the image generating unit 720 generates the first image signal S1 from the third image signal S3 generated in Step S721. Similarly, the image generating unit 720 generates the second image signal S2 from the fourth image signal S4 generated in Step S721. The first image signal S1 and the second image signal S2 are luminance image signals corresponding to the third image signal S3 and the fourth image signal S4 respectively. In order to generate the first image signal S1, the first image signal S1 is generated by applying the following Expression (12) to each pixel of the first image signal S1. Herein, Ib is the luminance value of the blue wavelength range included in the third image signal S3 generated in Step S721. Similarly, Ig is the luminance value of the green wavelength range included in the third image signal S3 generated in Step S721, and Ir is the luminance value of the red wavelength range included in the third image signal S3 generated in Step S721.

$$\text{signal value of first image signal} = Ib/4 + Ig/2 + Ir/4 \quad (12)$$

Similarly to the first image signal S1, the second image signal S2 can be generated by using the fourth image signal S4 generated in Step S721.

The distance information generating unit 410 generates the distance information Ird by the distance information generation process S410 by using the first image signal S1 and the second image signal S2 generated by the image generating unit 720. The chromatic aberration information acquiring unit 420 acquires the chromatic aberration information Ico by the chromatic aberration information acquisition process S420. The distance information correction unit 430 generates and outputs the corrected distance information Icd in which the influence caused by the chromatic aberration of the distance information Ird is corrected by the distance information correction process S430.

In the digital camera 100 of the present embodiment, each pixel group of the image sensor 701 is configured to be capable of acquiring both of the color information and the distance information. Consequently, the shift between the pixel position at which the distance information is calculated and the pixel position at which the color information is acquired is small, and it is possible to correct the chromatic aberration of the image-forming optical system 120 with higher accuracy.

Modification of Image Sensor

Each pixel of the image sensor 701 includes two photoelectric conversion units in the light-receiving layer 755 but, as in an image sensor 1101 described by using FIG. 11, three photoelectric conversion units may be provided in one pixel.

Figure 11A:
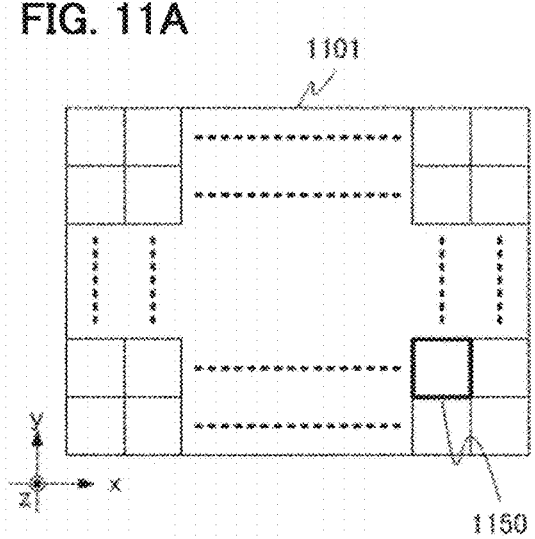
FIGS. 11A to 11C are views showing the configuration of an image sensor in a modification of the second embodiment.
Figure 11B:
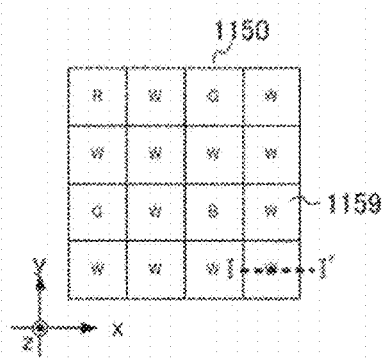
Figure 11C:
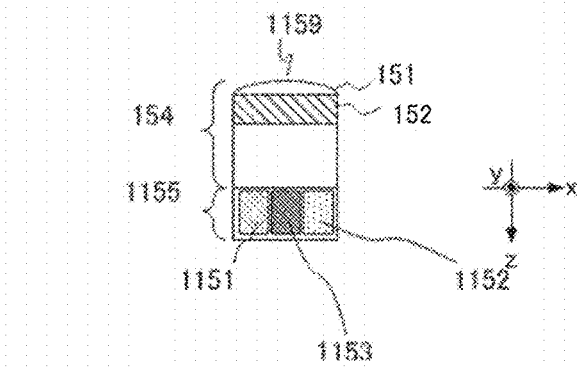

FIG. 11A is an xy cross-sectional view of the image sensor 1101. The image sensor 1101 in FIG. 11A is configured by disposing a plurality of pixel groups 1150. FIG. 11B is a view for explaining the pixel group 1150. In the pixel group 1150, pixels 1159 are arranged in four rows and four columns. In FIG. 11B, R denotes the red pixel, G denotes the green pixel, B denotes the blue pixel, and W denotes a white pixel. The red pixel, the green pixel, and the blue pixel have the spectral sensitivities shown in FIG. 2B. The white pixel has the spectral sensitivity shown in FIG. 2D. Except that the spectral sensitivities are different from each other, the pixels 1159 have the same structure. FIG. 11C is a view schematically showing a I-I' cross section. In the pixel 1159, three photoelectric conversion units (a first photoelectric conversion unit 1151, a second photoelectric conversion unit 1152, and a third photoelectric conversion unit 1153) are disposed in a light-receiving layer 1155.

The first photoelectric conversion unit 1151 performs photoelectric conversion on a received light flux to generate an electric signal. Similarly, each of the second photoelectric conversion unit 1152 and the third photoelectric conversion unit 1153 performs photoelectric conversion on a received light flux to generate an electric signal.

With the set of the electric signals generated by the first photoelectric conversion units 1151 of the individual pixels, a fourth image signal is generated. With the set of the electric signals generated by the second photoelectric conversion units 1152 of the individual pixels, a fifth image signal is generated. Further, with the set of the electric signals generated by the third photoelectric conversion units 1153 of the individual pixels, a third image signal is generated.

It is possible to obtain the intensity distribution of an image formed on the image sensor 1101 by the first light flux 311 from the fourth image signal, and it is possible to obtain the intensity distribution of an image formed on the image sensor 1101 by the second light flux 321 from the fifth image signal. Further, it is possible to obtain the intensity distribution of an image formed on the image sensor 1101 by a light flux mainly having passed through the central part of the exit pupil 130 from the third image signal.

Figure 12A:
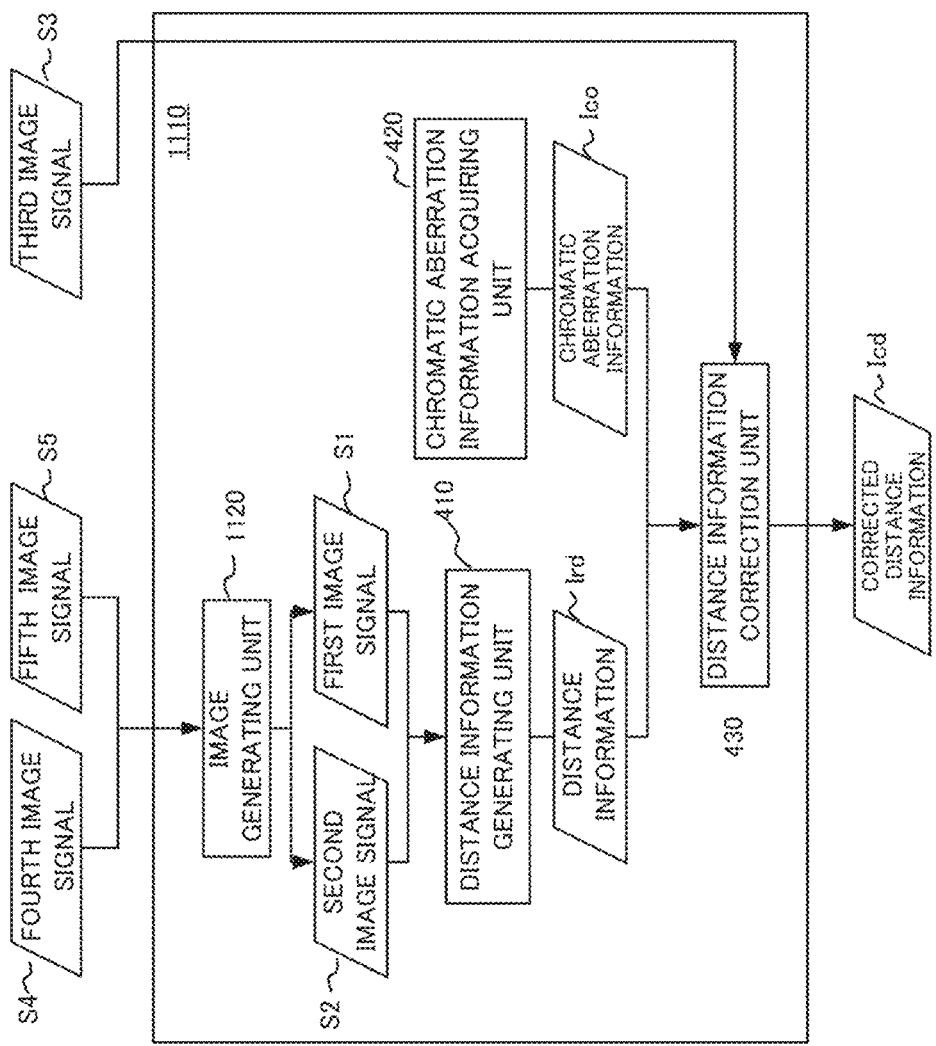
FIGS. 12A to 12C are views for explaining a distance information generating (correcting) method in the modification of the second embodiment.
Figure 12B:
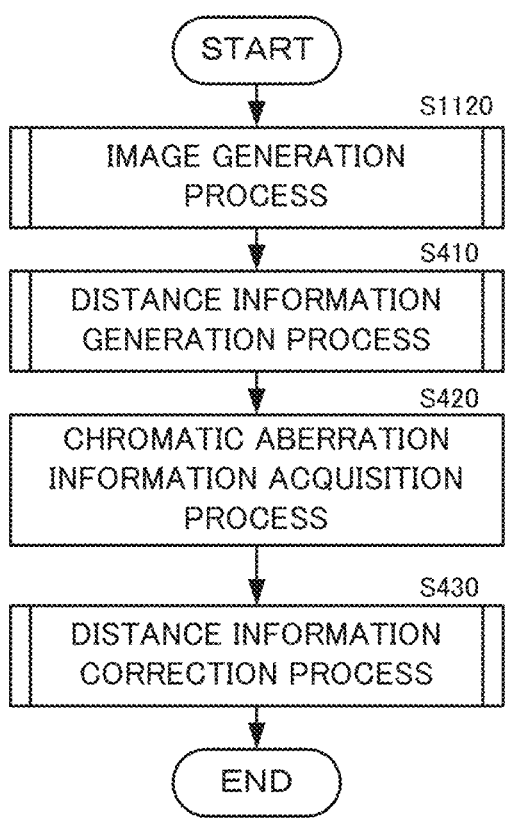

FIG. 12A is a block diagram showing the schematic configuration of a distance information generating apparatus 1110 in the case where the pixel 1159 includes three photoelectric conversion units, and FIG. 12B is a flowchart showing the operation of the distance information generating apparatus 1110.

Unlike the distance information generating apparatus 720, the distance information generating apparatus 1110 acquires a fourth image signal S4 and a fifth image signal S5 from the image sensor 1101, and generates and outputs the corrected distance information 1cd obtained by correcting the distance information Ird.

Figure 12C:
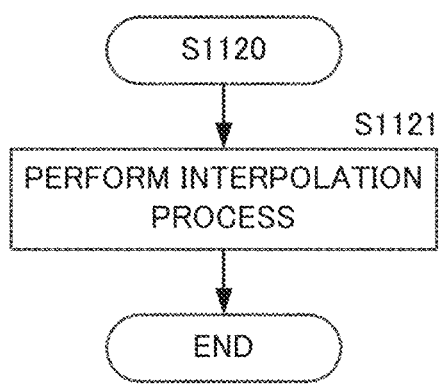

An image generating unit 1120 of the distance information generating apparatus 1110 acquires the fourth image signal S4 and the fifth image signal S5, and generates a first image signal S and a second image signal S2 by an image generation process S1120. Processes other than the image generation process S1120 are the same as those described above, and hence, hereinbelow, the image generation process S1120 in the image generating unit 1120 will be described by using FIG. 12C.

In Step S1121, the image generating unit 1120 performs the interpolation process of the fourth image signal S4 and the fifth image signal S5. In order to generate the image signal of the white pixel, the pixel value of the image signal is generated by interpolation that uses the luminance value of the adjacent white pixel for each of the pixel positions that do not have the pixel value of the white pixel (the pixel positions of the red pixel, the green pixel, and the blue pixel). As the interpolation process, it is possible to use, e.g., bilinear interpolation or bicubic interpolation. Considering that a search for the parallax is performed in the x direction, it is desirable to use linear interpolation in the y direction perpendicular to the search direction of the parallax.

In the case where the light-receiving layer 755 includes three photoelectric conversion units, it is possible to further increase a distance between the first pupil area 310 through which the first light flux 311 passes and the second pupil area 320 through which the second light flux 321 passes. As a result, it is possible to generate the distance information with higher accuracy.

Third Embodiment

As another mode of the digital camera 100 that includes the distance information generating apparatus 710, the configuration of a digital camera 900 shown in FIG. 9 may be used.

Figure 9A:
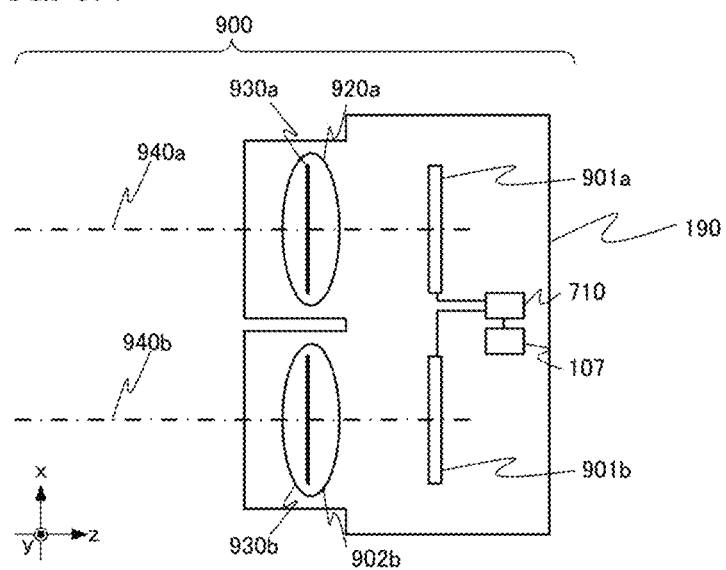
FIGS. 9A and 9B are views showing the configuration of the image sensor in the second embodiment.

In FIG. 9A, the reference numeral 900 indicates a digital camera that includes the distance information generating apparatus 710 of the present embodiment. The digital camera 900 has, in the camera case 190, a first image-forming optical system 920a, a second image-forming optical system 920b, an image sensor 901a, an image sensor 901b, the distance information generating apparatus 710, the information storing unit 170, an image generating unit (not shown), and a lens driving controlling unit (not shown). The first image-forming optical system 920a and the second image-forming optical system 920b are photographing lenses of the digital camera 900, and have functions of forming images of an object on the image sensor 901a and the image sensor 901b serving as imaging planes. The first image-forming optical system 920a is constituted by a plurality of lens groups and a diaphragm, and has an exit pupil 930a at a position a predetermined distance from the image sensor 901a. The second image-forming optical system 920b is constituted by a plurality of lens groups and a diaphragm, and has an exit pupil 930b at a position a predetermined distance from the image sensor 901b.

Figure 9B:
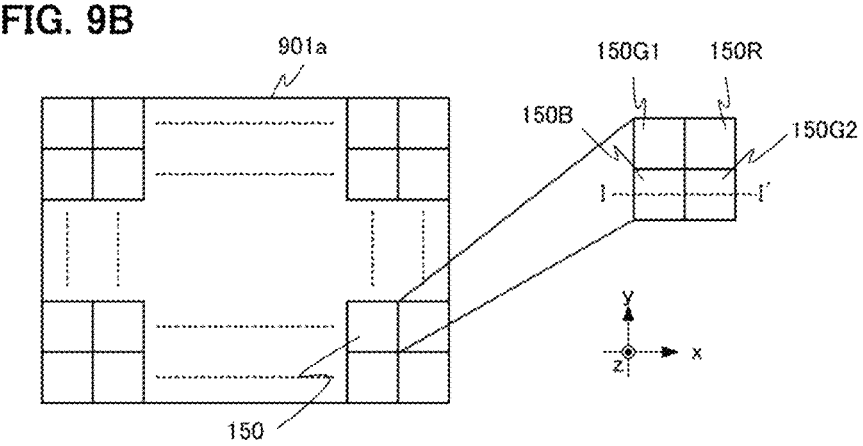

Each of the image sensor 901a and the image sensor 901b is constituted by the complementary metal oxide semiconductor (CMOS) and the charge-coupled device (CCD). FIG. 9B is an xy cross-sectional view of the image sensor 901a. The image sensor 901a in FIG. 9B is configured by disposing a plurality of pixel groups similar to the imaging pixel groups 150 of the image sensor 101. Similarly, the image sensor 901b is also configured by disposing a plurality of pixel groups similar to the imaging pixel groups 150 of the image sensor 101.

The photoelectric conversion unit 153 of the image sensor 901a performs photoelectric conversion on a received light flux to generate an electric signal. With the set of the electric signals generated by the photoelectric conversion units 153 of the individual pixels of the image sensor 901a, a third image signal is generated. Similarly, the photoelectric conversion unit 153 of the image sensor 901b performs photoelectric conversion on a received light flux to generate an electric signal. With the set of the electric signals generated by the photoelectric conversion units 153 of the individual pixels of the image sensor 901b, a fourth image signal is generated.

A pair of the first image-forming optical system 920a and the image sensor 901a and a pair of the second image-forming optical system 920b and the image sensor 901b are disposed so as to be spaced apart from each other by a predetermined base line length. A pair of the third image signal and the fourth image signal serves as a pair of image signals obtained by photographing the object from different eyepoints substantially at the same time, and has the parallax amount corresponding to the object distance. In addition, the individual pixels of the image sensor 901a and the image sensor 901b include color filters corresponding to the blue, green, and red wavelength ranges, and hence each of the third image signal and the fourth image signal includes three pieces of color information. That is, the digital camera 900 has the imaging function and the ranging function of the color image signal.

The distance information generating apparatus 710 generates the distance information Icd in which the influence of the chromatic aberration of each of the image-forming optical system 920a and the image-forming optical system 920b is corrected by using the third image signal acquired from the image sensor 901a and the fourth image signal acquired from the image sensor 901b, and outputs the distance information Icd. Unlike the digital camera 100, in the digital camera 900, the influence of the chromatic aberration of magnification of each of the image-forming optical system 920a and the image-forming optical system 920b is mainly corrected. That is, the information storing unit 170 of the digital camera 900 stores the amount of chromatic aberration of magnification of each of the image-forming optical system 920a and the image-forming optical system 920b as the chromatic aberration information.

In the digital camera 900 of the present embodiment, the same object is imaged from different eyepoints by disposing an optical axis 940a and an optical axis 940b at positions that are spaced apart from each other. By significantly increasing the distance between the optical axis 940a and the optical axis 940b, it is possible to increase the change of the parallax amount per object distance.

OTHER EMBODIMENTS

The above-described digital camera 100 can be used as an information acquiring unit for a robot or an automobile capable of making an action plan autonomously to recognize an external environment. The digital camera 100 can acquire the distance information in which the influence of the chromatic aberration is reduced and the color image signal, and hence it is possible to recognize the external environment more stably. It is also preferable to use the above-described digital camera 100 that is mounted on a mobile unit such as a robot or an automobile.

In the above description, as the distance information, the distance from the imaging apparatus to the object is determined, but the distance information may be another information that corresponds to the distance to the object. For example, as the distance information, the defocus amount may be used.

The present invention can also be implemented by a process in which a program that implements one or more functions of the embodiments described above is supplied to a system or an apparatus via a network or a storage medium, and one or more processors in a computer of the system or apparatus read and execute the program. In addition, the present invention can also be implemented by a circuit (e.g., an ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120848, filed on Jun. 20, 2017, which is hereby incorporated by reference herein in its entirety.

What is claimed is:

1. A distance information generating apparatus for generating distance information corresponding to a distance to an object, based on a first image signal and a second image signal, which have a parallax corresponding to the distance to the object, and a third image signal which includes a plurality of pieces of color information,
the distance information generating apparatus comprising:
   at least one processor which executes instructions stored in a memory, the at least one processor being configured to function as:
   a generating unit configured to generate the distance information, based on the parallax between the first image signal and the second image signal;
   an acquiring unit configured to acquire chromatic aberration information indicative of chromatic aberration of an image-forming optical system used in photographing of the first image signal and the second image signal; and
   a correction unit configured to correct the distance information generated in the generating unit based on the chromatic aberration information and weighting coefficients determined based on a contrast evaluation value calculated for each of the plurality of pieces of color information of the third image signal.

2. The distance information generating apparatus according to claim 1, wherein the correction unit is further configured to (1) determine a weighted average value of chromatic aberration amounts of the individual pieces of color information included in the chromatic aberration information, which is obtained by using the weighting coefficients, and to (2) correct the distance information generated in the generating unit by using the weighted average value.

3. The distance information generating apparatus according to claim 1,
   wherein the correction unit is further configured to (1) determine, at different positions in a second direction, a plurality of magnitudes of contrast change in a check area set in the third image signal and along a first direction of an image signal indicative of a target piece of color information, and to (2) generate the contrast evaluation value of each of the plurality of pieces of color information by integrating the plurality of magnitudes of contrast change,
   wherein the first direction is a search direction used in determination of the parallax between the first image signal and the second image signal, and
   wherein the second direction is orthogonal to the first direction.

4. The distance information generating apparatus according to claim 3, wherein each of the plurality of magnitudes of contrast change along the first direction is a standard deviation of a signal string extracted from the image signal along the first direction.

5. The distance information generating apparatus according to claim 3, wherein the integration of the plurality of magnitudes of contrast change along the first direction is performed by adding up or averaging the plurality of magnitudes of contrast change along the first direction.

6. The distance information generating apparatus according to claim 1, wherein the generating unit is further configured to (1) determine a conversion coefficient used to convert the parallax into the distance information, based on the contrast evaluation value and the chromatic aberration information, and to (2) generate the distance information from the parallax by using the determined conversion coefficient.

7. The distance information generating apparatus according to claim 1, wherein the first image signal is obtained by (1) multiplying the plurality of pieces of color information included in the third image signal by a predetermined weighting coefficient and (2) combining the plurality of pieces of color information after the multiplication.

8. The distance information generating apparatus according to claim 1, wherein the distance information is the distance to the object or a defocus amount.

9. An imaging apparatus comprising:
   an image-forming optical system;
   an image sensor disposed on an estimated focal plane of the image-forming optical system; and
   the distance information generating apparatus according to claim 1,
   wherein the image sensor includes:
   a plurality of types of imaging pixels configured to output the third image signal and having mutually different spectral sensitivity characteristics;
   a first ranging pixel configured to output the first image signal; and
   a second ranging pixel configured to output the second image signal,
   wherein the first ranging pixel includes a first photoelectric conversion unit configured to receive a light flux having passed through a first pupil area in an exit pupil of the image-forming optical system,
   wherein the second ranging pixel includes a second photoelectric conversion unit configured to receive a light flux having passed through a second pupil area that is positioned in the exit pupil of the image-forming optical system and is at least partially different from the first pupil area, and wherein the correction unit of the distance information generating apparatus corrects the distance information determined from the first image signal and the second image signal by using an axial chromatic aberration amount of the image-forming optical system.

10. A mobile unit, on which the imaging apparatus according to claim 9 is mounted.

11. An imaging apparatus comprising:
an image-forming optical system;
an image sensor disposed on an estimated focal plane of the image-forming optical system; and
the distance information generating apparatus according to claim 1,
wherein the image sensor includes a plurality of types of first pixels having mutually different spectral sensitivity characteristics,
wherein each of the first pixels includes:
a first photoelectric conversion unit configured to receive a light flux having passed through a first pupil area in an exit pupil of the image-forming optical system; and
a second photoelectric conversion unit configured to receive a light flux having passed through a second pupil area that is positioned in the exit pupil of the image-forming optical system and is at least partially different from the first pupil area,
wherein the first photoelectric conversion unit outputs the third image signal,
wherein the second photoelectric conversion unit outputs a fourth image signal,
wherein the first image signal is obtained by multiplying a plurality of pieces of color information included in the third image signal by a predetermined weighting coefficient and combining the plurality of pieces of color information after the multiplication,
wherein the second image signal is obtained by multiplying a plurality of pieces of color information included in the fourth image signal by a predetermined weighting coefficient and combining the plurality of pieces of color information after the multiplication, and
wherein the correction unit of the distance information generating apparatus corrects the distance information determined from the first image signal and the second image signal by using an axial chromatic aberration amount of the image-forming optical system.

12. An imaging apparatus comprising:
a first image-forming optical system;
a first image sensor disposed on an estimated focal plane of the first image-forming optical system;
a second image-forming optical system;
a second image sensor disposed on an estimated focal plane of the second image-forming optical system; and
the distance information generating apparatus according to claim 1,
wherein the first image sensor includes a plurality of types of first pixels having mutually different spectral sensitivity characteristics,
wherein the second image sensor includes a plurality of types of second pixels having mutually different spectral sensitivity characteristics,
wherein the plurality of types of first pixels output the third image signal,
wherein the plurality of types of second pixels output a fourth image signal,
wherein the first image signal is obtained by multiplying a plurality of pieces of color information included in the third image signal by a predetermined weighting coefficient and combining the plurality of pieces of color information after the multiplication;
wherein the second image signal is obtained by multiplying a plurality of pieces of color information included in the fourth image signal by a predetermined weighting coefficient and combining the plurality of pieces of color information after the multiplication, and
wherein the correction unit of the distance information generating apparatus corrects the distance information determined from the first image signal and the second image signal by using an amount of chromatic aberration of magnification of the first image-forming optical system or the second image-forming optical system.

13. An imaging apparatus comprising:
an image-forming optical system;
an image sensor disposed on an estimated focal plane of the image-forming optical system; and
the distance information generating apparatus according to claim 1,
wherein the image sensor includes a plurality of types of first pixels having mutually different spectral sensitivity characteristics,
wherein each of the first pixels includes:
a first photoelectric conversion unit configured to receive a light flux having passed through a first pupil area in an exit pupil of the image-forming optical system;
a second photoelectric conversion unit configured to receive a light flux having passed through a second pupil area that is positioned in the exit pupil of the image-forming optical system and is at least partially different from the first pupil area; and
a third photoelectric conversion unit configured to receive a light flux having passed through a third pupil area that is positioned in the exit pupil of the image-forming optical system and is at least partially different from the first pupil area and the second pupil area,
wherein the first image signal is generated based on an output from the first photoelectric conversion unit,
wherein the second image signal is generated based on an output from the second photoelectric conversion unit,
wherein the third image signal is generated based on an output from the third photoelectric conversion unit, and
wherein the correction unit of the distance information generating apparatus corrects the distance information determined from the first image signal and the second image signal by using an axial chromatic aberration amount of the image-forming optical system.

14. A distance information generating method for generating distance information corresponding to a distance to an object, based on a first image signal and a second image signal, which have a parallax corresponding to the distance to the object, and a third image signal which includes a plurality of pieces of color information,
the distance information generating method comprising:
a generation step of generating the distance information, based on the parallax between the first image signal and the second image signal;
an acquisition step of acquiring chromatic aberration information indicative of chromatic aberration of an image-firming optical system used in photographing of the first image signal and the second image signal; and
a correction step of correcting the distance information generated in the generation step based on the chromatic aberration information and weighting coefficients determined based on a contrast evaluation value calculated for each of the plurality of pieces of color information of the third image signal.

15. A non-transitory computer-readable storage medium storing a program for causing a computer to execute a distance information generating method for generating distance information corresponding to a distance to an object, based on a first image signal and a second image signal, which have a parallax corresponding to the distance to the object, and a third image signal which includes a plurality of pieces of color information, the distance information generating method comprising:
- a generation step of generating the distance information, based on the parallax between the first image signal and the second image signal;
- an acquisition step of acquiring chromatic aberration information indicative of chromatic aberration of an image-forming optical system used in photographing of the first image signal and the second image signal; and
- a correction step of correcting the distance information generated in the generation step based on the chromatic aberration information and weighting coefficients determined based on a contrast evaluation value calculated for each of the plurality of pieces of color information of the third image signal.

* * * * *